United States Patent
Moraites et al.

(10) Patent No.: US 9,704,233 B2
(45) Date of Patent: *Jul. 11, 2017

(54) SYSTEM, METHOD, AND COMPUTER PROGRAM PRODUCT FOR INDICATING HOSTILE FIRE

(71) Applicant: Lockheed Martin Corporation, Bethesda, MD (US)

(72) Inventors: Stephen C. Moraites, Owego, NY (US); Shawn McPhail, Owego, NY (US); Donald Sobiski, Spencer, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/157,174

(22) Filed: May 17, 2016

(65) Prior Publication Data

US 2016/0321798 A1 Nov. 3, 2016

Related U.S. Application Data

(60) Continuation of application No. 14/709,634, filed on May 12, 2015, now Pat. No. 9,360,370, which is a
(Continued)

(51) Int. Cl.
*F41G 7/22* (2006.01)
*G01J 5/00* (2006.01)
(Continued)

(52) U.S. Cl.
CPC ............ *G06T 7/0004* (2013.01); *F41H 13/00* (2013.01); *G01J 5/0022* (2013.01); *G01P 5/10* (2013.01);
(Continued)

(58) Field of Classification Search
CPC ........ F41G 7/2253; G01J 5/0022; G01P 5/10; G06T 2207/30241
(Continued)

(56) References Cited

U.S. PATENT DOCUMENTS 3,445,808 A 5/1969 Johnson
3,699,341 A 10/1972 Quillinan et al.
(Continued)

FOREIGN PATENT DOCUMENTS

EP 0627086 A1 8/1993
EP 655139 B1 5/1995
(Continued)

OTHER PUBLICATIONS

Nonfinal Office Action in U.S. Appl. No. 13/527,134, dated Jul. 21, 2016.
(Continued)

*Primary Examiner* — Mark R Gaworecki
(74) *Attorney, Agent, or Firm* — Miles & Stockbridge P.C.

(57) ABSTRACT

Systems, methods, and computer program products for identifying hostile fire. A characteristic of a fired projectile is detected using an optical system and the projectile's travel path in relation to a vehicle is determined. If the determined travel path of the projectile is within a predetermined distance from the vehicle, it is determined that the projectile is hostile towards the vehicle and a warning is output.

24 Claims, 14 Drawing Sheets

Related U.S. Application Data division of application No. 13/826,176, filed on Mar. 14, 2013, now Pat. No. 9,146,251.

(51) Int. Cl.

| | | |
|---|---|---|
| *G06T 7/20* | (2017.01) | |
| *G01P 5/10* | (2006.01) | |
| *G06T 7/00* | (2017.01) | |
| *F41H 13/00* | (2006.01) | |
| *G06T 7/60* | (2017.01) | |
| *H04N 5/33* | (2006.01) | |
| *H04N 17/00* | (2006.01) | |
| *G06T 7/70* | (2017.01) | |

(52) U.S. Cl.
CPC .............. *G06T 7/20* (2013.01); *G06T 7/60* (2013.01); *G06T 7/70* (2017.01); *H04N 5/33* (2013.01); *H04N 17/002* (2013.01); *G01J 2005/0077* (2013.01); *G06T 2207/10016* (2013.01); *G06T 2207/10048* (2013.01); *G06T 2207/30212* (2013.01); *G06T 2207/30241* (2013.01); *G06T 2207/30244* (2013.01)

(58) Field of Classification Search
IPC ........................................................ G01P 5/10
See application file for complete search history.

(56) References Cited

U.S. PATENT DOCUMENTS

| | | | |
|---|---|---|---|
| 3,870,995 A | 3/1975 | Nielson | |
| 3,897,150 A | 7/1975 | Bridges et al. | |
| 3,905,035 A | 9/1975 | Krumboltz et al. | |
| 3,944,167 A | 3/1976 | Figler et al. | |
| 3,964,695 A | 6/1976 | Harris | |
| 4,093,154 A | 6/1978 | McLean | |
| 4,160,974 A | 7/1979 | Stavis | |
| 4,290,364 A | 9/1981 | Weidenhagen et al. | |
| 4,323,993 A | 4/1982 | Soderblom et al. | |
| 4,342,032 A | 7/1982 | Roesch et al. | |
| 4,460,240 A | 7/1984 | Hudson | |
| 4,647,759 A | 3/1987 | Worsham et al. | |
| 4,739,329 A | 4/1988 | Ward et al. | |
| 4,744,761 A | 5/1988 | Doerfel et al. | |
| 4,796,834 A | 1/1989 | Ahlstrom | |
| 4,813,877 A | 3/1989 | Sanctuary et al. | |
| 4,855,932 A | 8/1989 | Cangiani | |
| 4,964,723 A | 10/1990 | Margue et al. | |
| 4,990,920 A | 2/1991 | Sanders, Jr. | |
| 5,042,743 A | 8/1991 | Carney | |
| 5,066,956 A | 11/1991 | Martin | |
| 5,122,801 A | 6/1992 | Hughes | |
| 5,123,327 A | 6/1992 | Alston et al. | |
| 5,231,480 A | 7/1993 | Ulich | |
| 5,233,541 A | 8/1993 | Corwin et al. | |
| 5,241,518 A | 8/1993 | McNelis et al. | |
| 5,287,110 A | 2/1994 | Tran | |
| 5,292,195 A | 3/1994 | Crisman, Jr. | |
| 5,300,780 A | 4/1994 | Denney | |
| 5,347,910 A | 9/1994 | Avila et al. | |
| 5,371,581 A | 12/1994 | Wangler et al. | |
| 5,415,548 A | 5/1995 | Adams | |
| 5,430,810 A | 7/1995 | Saeki | |
| 5,461,571 A | 10/1995 | Tran | |
| 5,549,477 A | 8/1996 | Tran et al. | |
| 5,579,009 A | 11/1996 | Nilsson-Almqvist et al. | |
| 5,600,434 A | 2/1997 | Warm | |
| 5,637,866 A | 6/1997 | Riener et al. | |
| 5,685,636 A | 11/1997 | German | |
| 5,719,797 A | 2/1998 | Sevachko | |
| 5,742,384 A | 4/1998 | Farmer | |
| 5,808,226 A | 9/1998 | Allen et al. | |
| 5,837,918 A | 11/1998 | Sepp | |
| 5,850,285 A | 12/1998 | Hill, Jr. | |
| 5,945,926 A | 8/1999 | Ammar et al. | |
| 5,969,676 A | 10/1999 | Tran et al. | |
| 5,988,645 A | 11/1999 | Downing | |
| 5,992,288 A | 11/1999 | Barnes | |
| 5,999,130 A | 12/1999 | Snow et al. | |
| 6,057,915 A | 5/2000 | Squire et al. | |
| 6,078,681 A | 6/2000 | Silver | |
| 6,137,436 A | 10/2000 | Koch | |
| 6,196,497 B1 | 3/2001 | Lankes et al. | |
| 6,212,471 B1 | 4/2001 | Stiles et al. | |
| 6,222,464 B1 | 4/2001 | Tinkel et al. | |
| 6,410,897 B1 | 6/2002 | O'Neill | |
| 6,489,915 B1 | 12/2002 | Lines et al. | |
| 6,498,580 B1 | 12/2002 | Bradford | |
| 6,621,764 B1 | 9/2003 | Smith | |
| 6,650,407 B2 | 11/2003 | Jamieson et al. | |
| 6,669,477 B2 | 12/2003 | Hulet | |
| 6,693,561 B2 | 2/2004 | Kaplan | |
| 6,707,052 B1 | 3/2004 | Wild et al. | |
| 6,723,975 B2 | 4/2004 | Saccomanno | |
| 6,734,824 B2 | 5/2004 | Herman | |
| 6,741,341 B2 | 5/2004 | DeFlumere | |
| 6,796,213 B1 | 9/2004 | McKendree | |
| 6,822,583 B2 | 11/2004 | Yannone et al. | |
| 6,825,791 B2 | 11/2004 | Sanders et al. | |
| 6,836,320 B2 | 12/2004 | DeFlumere et al. | |
| 6,945,780 B2 | 9/2005 | Perry | |
| 6,952,001 B2 | 10/2005 | McKendree et al. | |
| 6,956,523 B2 | 10/2005 | Mohan | |
| 6,969,845 B2 | 11/2005 | Von Rosenberg, Jr. | |
| 6,980,152 B2 | 12/2005 | Steadman et al. | |
| 6,985,212 B2 | 1/2006 | Jamieson et al. | |
| 6,995,660 B2 | 2/2006 | Yannone et al. | |
| 7,026,600 B2 | 4/2006 | Jamieson et al. | |
| 7,035,308 B1 | 4/2006 | McNeil et al. | |
| 7,047,861 B2 | 5/2006 | Solomon | |
| 7,110,880 B2 | 9/2006 | Breed et al. | |
| 7,126,877 B2 | 10/2006 | Barger et al. | |
| 7,132,928 B2 | 11/2006 | Perricone | |
| 7,193,691 B2 | 3/2007 | Weber | |
| 7,205,520 B1 | 4/2007 | Busse | |
| 7,219,086 B2 | 5/2007 | Geshwind | |
| 7,282,695 B2 | 10/2007 | Weber et al. | |
| 7,333,047 B2 | 2/2008 | Fullerton et al. | |
| 7,359,285 B2 | 4/2008 | Barger et al. | |
| 7,378,626 B2 | 5/2008 | Fetterly | |
| 7,379,845 B2 | 5/2008 | Gorinevsky et al. | |
| 7,504,982 B2 | 3/2009 | Berg et al. | |
| 7,609,156 B2 | 10/2009 | Mullen | |
| 7,654,185 B1 | 2/2010 | Yannone | |
| 7,688,247 B2 | 3/2010 | Anschel et al. | |
| 7,690,291 B2 | 4/2010 | Quinn | |
| 7,696,919 B2 | 4/2010 | Moraites | |
| 7,710,278 B2 | 5/2010 | Holmes et al. | |
| 7,710,828 B2 | 5/2010 | Barger et al. | |
| 7,755,495 B2 | 7/2010 | Baxter et al. | |
| 7,765,083 B2 | 7/2010 | Zank et al. | |
| 7,769,502 B2 | 8/2010 | Herman | |
| 7,787,331 B2 | 8/2010 | Barger et al. | |
| 7,830,299 B2 | 11/2010 | Steele et al. | |
| 7,848,879 B2 | 12/2010 | Herman | |
| 7,870,816 B1 | 1/2011 | Willingham et al. | |
| 7,925,159 B2 | 4/2011 | Dove | |
| 7,973,658 B2 | 7/2011 | Parish et al. | |
| 8,009,515 B2 | 8/2011 | Cecala et al. | |
| 8,013,302 B2 | 9/2011 | Meir | |
| 8,025,230 B2 | 9/2011 | Moraites et al. | |
| 8,164,037 B2 | 4/2012 | Jenkins | |
| 8,258,998 B2 | 9/2012 | Factor | |
| 9,103,628 B1 | 8/2015 | Moraites et al. | |
| 9,146,251 B2 * | 9/2015 | Moraites | ............... G01J 5/0022 |
| 9,170,070 B2 | 10/2015 | Sharpin | |
| 9,196,041 B2 | 11/2015 | Moraites et al. | |
| 9,360,370 B2 * | 6/2016 | Moraites | ............... G01J 5/0022 |
| 2002/0064760 A1 | 5/2002 | Lazecki et al. | |
| 2003/0008265 A1 | 1/2003 | Hulet | |
| 2004/0027257 A1 | 2/2004 | Yannone et al. | |
| 2004/0030570 A1 | 2/2004 | Solomon | |
| 2004/0183679 A1 | 9/2004 | Paximadis | |

(56) References Cited

U.S. PATENT DOCUMENTS

| | | |
|---|---|---|
| 2005/0012657 A1 | 1/2005 | Mohan |
| 2005/0065668 A1 | 3/2005 | Sanghera et al. |
| 2005/0150371 A1 | 7/2005 | Rickard |
| 2005/0224706 A1 | 10/2005 | Von Rosenberg, Jr. |
| 2006/0000988 A1 | 1/2006 | Stuart et al. |
| 2006/0017939 A1 | 1/2006 | Jamieson et al. |
| 2006/0021498 A1 | 2/2006 | Moroz et al. |
| 2006/0044941 A1 | 3/2006 | Barger |
| 2006/0163446 A1 | 7/2006 | Guyer et al. |
| 2006/0242186 A1 | 10/2006 | Hurley |
| 2007/0040062 A1 | 2/2007 | Lau et al. |
| 2007/0092109 A1 | 4/2007 | Lee |
| 2007/0125951 A1 | 6/2007 | Snider et al. |
| 2007/0144396 A1 | 6/2007 | Hamel et al. |
| 2007/0201015 A1 | 8/2007 | Gidseg et al. |
| 2007/0206177 A1 | 9/2007 | Anschel et al. |
| 2007/0219720 A1 | 9/2007 | Trepagnier |
| 2007/0236382 A1 | 10/2007 | Dove |
| 2008/0018520 A1 | 1/2008 | Moreau |
| 2008/0074306 A1 | 3/2008 | Akerlund |
| 2008/0133070 A1 | 6/2008 | Herman |
| 2008/0191926 A1 | 8/2008 | Benayahu et al. |
| 2008/0206718 A1 | 8/2008 | Jaklitsch et al. |
| 2008/0291075 A1 | 11/2008 | Rapanotti |
| 2008/0314234 A1 | 12/2008 | Boyd et al. |
| 2009/0051510 A1 | 2/2009 | Follmer et al. |
| 2009/0087029 A1 | 4/2009 | Coleman et al. |
| 2009/0173788 A1 | 7/2009 | Moraites et al. |
| 2009/0174589 A1 | 7/2009 | Moraites |
| 2009/0189785 A1 | 7/2009 | Kravitz et al. |
| 2009/0219393 A1 | 9/2009 | Vian et al. |
| 2009/0224958 A1 | 9/2009 | Aphek |
| 2009/0226109 A1 | 9/2009 | Warren et al. |
| 2009/0236422 A1 | 9/2009 | Kleder |
| 2009/0250634 A1 | 10/2009 | Chicklis et al. |
| 2009/0321636 A1 | 12/2009 | Ragucci et al. |
| 2009/0322584 A1 | 12/2009 | Herman |
| 2010/0026554 A1 | 2/2010 | Longman et al. |
| 2010/0117888 A1 | 5/2010 | Simon |
| 2010/0135120 A1 | 6/2010 | Cecala et al. |
| 2010/0253567 A1 | 10/2010 | Factor et al. |
| 2010/0278347 A1 | 11/2010 | Succi et al. |
| 2011/0001062 A1 | 1/2011 | Herman et al. |
| 2011/0010025 A1 | 1/2011 | Eu et al. |
| 2011/0196551 A1 | 8/2011 | Lees et al. |
| 2012/0174768 A1 | 7/2012 | Spransy |
| 2012/0211562 A1 | 8/2012 | Cook |
| 2013/0201052 A1 | 8/2013 | Saint Clair |
| 2015/0285902 A1 | 10/2015 | Moraites et al. |
| 2015/0293212 A1 | 10/2015 | Moraites et al. |
| 2015/0310627 A1 | 10/2015 | Moraites et al. |
| 2015/0377709 A1 | 12/2015 | Moraites et al. |
| 2016/0298940 A1 | 10/2016 | Moraites et al. |
| 2016/0298941 A1 | 10/2016 | Moraites et al. |

FOREIGN PATENT DOCUMENTS

| | | |
|---|---|---|
| EP | 2 239 595 A2 | 10/2010 |
| JP | 2001-091650 A | 4/2001 |
| WO | WO 92/19982 A1 | 11/1992 |
| WO | WO 93/16395 | 8/1993 |
| WO | WO 94/04939 A1 | 3/1994 |
| WO | WO 2004/046750 A2 | 6/2004 |
| WO | WO 2005/024751 A1 | 3/2005 |

OTHER PUBLICATIONS

Final Office Action in U.S. Appl. No. 14/789,925, dated Nov. 7, 2016.
Nonfinal Office Action in U.S. Appl. No. 14/789,925, dated Jul. 22, 2016.
Notice of Allowance in U.S. Appl. No. 14/789,761, dated Jul. 29, 2016.
Dowling, Dave, PMA 272 Presentation for 2010 AAAA Aircraft Survivability Symposium "One Team—One Fight—One Future"/ "Moving Forward on Naval Rotary Wing Integrated ASE" Laying the Framework for the Future, Nov. 17, 2010, 28 pages.
Notice of Allowance in U.S. Appl. No. 13/826,176 dated May 4, 2015.
Nonfinal Office Action in U.S. Appl. No. 13/804,791 dated Mar. 18, 2015.
Nonfinal Office Action in U.S. Appl. No. 13/804,513 dated Mar. 19, 2015.
Final Office Action in U.S. Appl. No. 13/804,513 dated May 19, 2015.
Final Office Action in U.S. Appl. No. 13/804,791, dated May 27, 2015.
Nonfinal Office Action in U.S. Appl. No. 14/709,634, dated Jun. 9, 2015.
Notice of Allowance in U.S. Appl. No. 13/804,791, dated Jun. 22, 2015.
Notice of Allowance in U.S. Appl. No. 13/804,513, dated Jul. 23, 2015.
Notice of Allowance in U.S. Appl. No. 14/709,634, dated Feb. 1, 2016.
Nonfinal Office Action in U.S. Appl. No. 13/527,056, dated Jul. 29, 2016.
Nonfinal Office Action in U.S. Appl. No. 15/191,325, dated Sep. 12, 2016.
Nonfinal Office Action in U.S. Appl. No. 15/191,373, dated Sep. 12, 2016.
Notice of Allowance in U.S. Appl. No. 14/789,761, dated Sep. 30, 2016.
Final Office Action in U.S. Appl. No. 13/527,134, dated Dec. 12, 2016.
Notice of Allowance in U.S. Appl. No. 13/527,056, dated Dec. 14, 2016.
Notice of Allowance in U.S. Appl. No. 14/789,925, dated Feb. 2, 2017.
Notice of Allowance in U.S. Appl. No. 13/527,134, dated Mar. 23, 2017.
Notice of Allowance in U.S. Appl. No. 15/191,373, dated Mar. 27, 2017.
Notice of Allowance in U.S. Appl. No. 15/191,325, dated Mar. 29, 2017.

* cited by examiner

SYSTEM, METHOD, AND COMPUTER PROGRAM PRODUCT FOR INDICATING HOSTILE FIRE

Embodiments of the invention relate generally to systems, methods, and computer program products for indicating hostile fire at a vehicle, for instance, an aircraft. Embodiments of the invention also involve a network for indicating hostile fire and systems, methods, and computer program products thereof. Further, one or more embodiments of the invention involve hostile fire damage assessment systems, methods, and computer program products.

SUMMARY

One or more embodiments of the present invention include a method for indicating hostile fire, comprising: electronically detecting infrared radiation of a projectile in a field of view (FOV); electronically determining a travel path of the projectile based on the electronically detecting infrared radiation of the projectile in the FOV; comparing the determined travel path of the projectile to an electronic location indication; and responsive to the comparing, electronically outputting an indication that the projectile is hostile with respect to the location corresponding to the electronic location indication.

Optionally, the method can comprise, responsive to the comparing, automatically outputting control signals to initiate a countermeasure system. The location corresponding to the electronic location indication can be representative of a location of an airborne vehicle, for instance, a helicopter, and the indication that the projectile is hostile can indicate that the projection will hit or will likely hit the vehicle. Further, the electronically detecting and the electronically determining a travel path of the projectile can be performed by a camera with an IR sensor, wherein a portion of the travel path may be indicated as a two-dimensional representation over time.

Additionally, one or more embodiments can include a system operative on an airborne vehicle, for instance a helicopter, that is operative during the day and at night to determine whether the vehicle, while in flight, is an intended target of a fired unguided energetic projectile, the system comprising: a focal plane array (FPA) mounted to or onboard the vehicle, the FPA having a field of view (FOV) and a sensitivity sufficient to capture a firing signature of the fired unguided energetic projectile, the firing signature including at least one of a firing component generated upon firing of the projectile, a tracer-related component associated with projectile pyrotechnics, and a friction component generated by friction as the projectile travels through the troposphere, pixels of the FPA being operative to capture a portion of a trail of energy associated with the heat signature of the fired projectile, the captured portion of the trail of energy being a two-dimensional representation over time of a three-dimensional trajectory of the fired projectile projected onto the FPA; an image processor located on board the vehicle operative to receive signals from the FPA corresponding to the captured portion of the trail of energy, the processor being operative to post-process in near real time the signals from the FPA and to make a determination as to whether the in-flight vehicle was the intended target of the fired projectile by analyzing the relationship of the captured portion of the trail of energy with respect to the FOV; and an alert system operatively coupled to the processor to generate timely audible and visible indications that the in-flight vehicle is the intended target of the fired projectile.

The unguided energetic projectile may be any one of a rocket-propelled grenade (RPG) in its ballistic phase of trajectory, for instance, anti-aircraft artillery (AAA), and small arms fire. The firing signature may be a heat signature of the projectile that can include, for instance, at least one of the firing component generated upon firing of the projectile, the tracer-related component associated with projectile pyrotechnics, and the friction component generated by friction as the projectile travels through the troposphere.

Optionally, the image processor is operative to determine estimated vertical miss distance and/or horizontal miss distance of the fired projectile with respect to the vehicle by analyzing corresponding components of the captured portion of the trail of energy as functions of time and velocity, for example, vehicle velocity and/or projectile velocity. Optionally, the vehicle velocity may be subtracted from the equation. Further, in one or more embodiments of the present invention, the FOV can be adjustable in terms of direction and/or volume independent of the orientation of the vehicle. In one or more embodiments the system can be configured and operative to capture and process multiple firing signatures from multiple fired projectiles and to determine whether any of the fired projectiles is intended for the vehicle. Optionally, the system can be configured and operative to determine whether the projectile will hit, will likely hit, did hit, and/or did likely hit the vehicle. Put another way, the system can be configured and operative to determine whether the projectile will miss, will likely miss, did miss, and/or did likely miss the vehicle.

In one or more embodiments of the system, the system may comprise a countermeasure system onboard the vehicle that is operative to deploy one of a soft-kill weapon, a non-lethal weapon, and a hard-kill weapon in response to the determination that the in-flight vehicle was the intended target of the fired projectile, the weapon being deployed to a determined location or location area associated with the fired projectile, wherein the determined location or location area is determined based on the signals from the FPA corresponding to the captured portion of the trail of energy. Optionally, the determined location or location area is determined based on the signals from the FPA corresponding to the captured portion of the trail of energy and also based on signals from an other FPA of the system, the other FPA having a field of view (FOV) and a sensitivity sufficient to capture a portion of the firing signature of the fired unguided energetic projectile from the perspective of the other FPA, the firing signature from the perspective of the other IR camera including at least one of a firing component generated upon firing of the projectile, a tracer-related component associated with projectile pyrotechnics, and a friction component generated by friction as the projectile travels through the troposphere, pixels of the other FPA being operative to capture a portion of a trail of energy associated with the portion of the firing signature of the fired projectile from the perspective of the other FPA. The determined location or location area can be an origination location or location area of the unguided energetic projectile, and the image processor can be configured and operative to process signals from the FPA and the signals from the other FPA to determine a distance to the origination location or location area of the unguided energetic projectile. Optionally, in addition to the two aforementioned FPAs, one or more additional FPAs may implemented, for instance, to determine the distance to the origination location or location area of the unguided energetic projectile.

Optionally, the system can also comprise one or more of a shock wave front detection subsystem, a microphone array subsystem, an electrostatic environment detection subsystem, and a radar detection subsystem. The system can also optionally comprise the infrared (IR) camera and at least one more of the IR cameras, each of the IR cameras having a FOV, the FOVs combining to form a total FOV for the system. Alternatively, the system may include only IR detection components and not the aforementioned shock wave front detection, microphone array, electrostatic environment detection, and radar detection subsystems, in order to identify hostile fire aimed at the vehicle.

One or more embodiments of the invention can also include a non-transitory computer readable storage medium having stored thereon software instructions that, when executed by a processor, cause the processor to perform operations comprising: analyze received electronic data regarding a sensed heat signature portion of an unguided projectile; and determining a miss distance of the unguided projectile based on the analyzed received electronic data, the miss distance being one or more of a vertical miss distance and a horizontal miss distance. The miss distance may be a calculated estimate of miss. Further, the heat signature portion may include one or more of a firing component generated upon firing of the projectile, a tracer-related component associated with projectile pyrotechnics, and a friction component. Optionally, the processor can be caused to perform operations comprising: responsive to the determined miss distance of the unguided projectile, identify whether or not the unguided projectile is hostile or friendly; and in the case of a hostile identification, output an indication that the unguided projectile is hostile. Optionally, the processor can cause the follow operation: if the determining the miss distance indicates no miss, output an indication that the unguided projectile will be a hit or likely be a hit.

The miss distance may be with respect to a flying vehicle, can include both the vertical miss distance and the horizontal miss distance, and can be determined by analyzing corresponding vertical and horizontal components of the sensed heat signature as functions of time and velocity, for example, vehicle velocity and/or projectile velocity. Optionally, the vehicle velocity may be subtracted from the equation. Further, optionally, the received electronic data is from an IR camera that captures the sensed heat signature portion of the unguided projectile, the miss distance being calculated based on the sensed heat signature within the FOV of the IR camera. In addition, the received electronic data can optionally be from a plurality of IR cameras that capture respective portions of the heat signature of the unguided projectile in the FOVs, wherein the miss distance is calculated based on the sensed heat signature portions sensed by the IR cameras. Each of the IR cameras may be spaced distances away from each other. Differences in the displays of the IR cameras may be used to determine a range or distance away from the vehicle of the location or location area from which the projectile originated. Optionally, portions of the FOVs for at least two IR cameras may overlap, for example, by five or ten degrees.

In one or more embodiments of the invention, a method for indicating hostile fire, can comprise: receiving, at a first airborne vehicle, automatically transmitted hostile fire data regarding a second airborne vehicle, the automatically transmitted hostile fire data indicating that the second airborne vehicle is a target or likely target of hostile fire, the hostile fire data being derived from electronically detected infrared radiation associated with the hostile fire; and responsive to the electronically receiving, automatically and electronically outputting an output signal for remedial action of the first airborne vehicle. Optionally, the method can further comprise: prior to the receiving at the first airborne vehicle, automatically transmitting hostile fire data regarding a second airborne vehicle; electronically detecting infrared radiation associated with the hostile fire in a field of view (FOV) of a camera with an IR sensor; electronically determining that the second airborne vehicle is the target or likely target of hostile fire based on the electronically detected infrared radiation associated with the hostile fire; and automatically transmitting the hostile fire data regarding the second airborne vehicle to at least the first airborne vehicle. Further, optionally, the first airborne vehicle may electronically detect infrared radiation associated with the hostile fire in a FOV of its own camera or cameras with corresponding IR sensors. Data obtained from such sensing, whether or not processed to determine whether the first airborne vehicle is the target or likely target of the hostile fire, may be transmitted to the second airborne vehicle. Thus, information may be transmitted in both directions between the two platforms of the airborne vehicles (at least these two vehicles). Such shared information may be used to obtain initial or better accuracy with respect a location or location area of the hostile fire and/or a distance to the location or location area of the hostile fire.

The output signal for remedial action can be for activation of one or more of a tactile display (e.g., a matrix of vibrating or buzzing elements in a vest, a seat, etc.), a visual alert, an audible alert, a countermeasure system, a transmission operation of hostile fire data regarding the second airborne vehicle from the first airborne vehicle to a third airborne vehicle, a data recording system, an evasive maneuver system, and a de-engagement of autopilot. Further, optionally, the automatically transmitted hostile fire data indicating that the second airborne vehicle is a target or likely target of hostile fire may be based on a probability calculation regarding whether the hostile fire will hit, will likely hit, will miss, or will likely miss the second airborne vehicle. The received hostile fire data at the first airborne vehicle regarding a second airborne vehicle can include data regarding a hit location or likely hit location on the second airborne vehicle of the hostile fire.

The invention can also include one or more embodiments involving a network for communicating detection of hostile fire, the network comprising: a first helicopter system onboard a first helicopter, the first helicopter system being operative during the day and at night to determine whether the first helicopter, while in flight, is an intended target of a fired unguided energetic projectile. The first helicopter system can include: an infrared (IR) camera, the IR camera having a field of view (FOV) and a predetermined sensitivity sufficient to capture a portion of a heat signature of the fired unguided energetic projectile, the heat signature including at least one of a firing component generated upon firing of the projectile, a tracer-related component associated with projectile pyrotechnics, and a friction component generated by friction as the projectile travels through the troposphere, pixels of the IR camera being operative to capture a portion of a trail of energy associated with the heat signature of the fired projectile, the captured portion of the trail of energy being a two-dimensional representation over time of the projectile; an image processor located on board the first helicopter and operative to receive signals from the IR camera corresponding to the captured portion of the trail of energy, the processor being operative to post-process in near real time the signals from the IR camera and to make a determination as to whether the in-flight helicopter was the intended target of the fired projectile by analyzing the relationship of the captured portion of the trail of energy with respect to the FOV of the IR camera, the pixels of the IR camera being mapped to angles in the FOV; and a transmitter to transmit to a second helicopter system onboard a second helicopter of the network signals indicating that the first helicopter is subject to hostile fire. The unguided energetic projectile may be any one of a rocket-propelled grenade (RPG) in its ballistic phase of trajectory, for instance, anti-aircraft artillery (AAA), and small arms fire.

Optionally, the second helicopter system can include: a receiver to receive the signals indicating that the first helicopter is subject to hostile fire; and an alert system operatively to generate timely audible, visible, and/or tactile hostile fire indications in response to the received signals indicating that the first helicopter is subject to hostile fire. The tactile display can include a matrix of vibrating or buzzing elements in a vest, a seat, etc., for example.

In one or more embodiments, the transmitter can transmit signals indicating that the first helicopter is subject to hostile fire to the second helicopter system and to one or more additional helicopter systems onboard respective one or more helicopters and/or to one or more additional non-helicopter aircraft systems. Further, optionally, the image processor of the first helicopter system may be operative to determine vertical and/or horizontal miss distances of the fired projectile with respect to the first helicopter by analyzing corresponding horizontal and vertical components of the captured portion of the trail of energy as functions of time and velocity, for example, first helicopter velocity and/or projectile velocity.

In one or more embodiments, the transmitter of the first helicopter system can be operative to transmit data associated with a determined location or location area associated with the fired projectile to the second helicopter system, the determined location or location area being determined based on the signals from the IR camera corresponding to the captured portion of the trail of energy, and wherein the second helicopter system can include: a receiver to receive the signals indicating that the first helicopter is subject to hostile fire and the determined location or location area data; and a countermeasure system onboard the second helicopter that is operative to deploy one of a soft-kill weapon, a non-level weapon, and a hard-kill weapon in response to the determination that the first helicopter was subject to hostile fire, the weapon being deployed to the determined location or location area associated with the fired projectile.

For one or more embodiments, the first helicopter system can be configured and operative to capture and process multiple heat signatures from multiple fired projectiles and to determine whether any of the fired projectiles is intended for the first helicopter. Additionally, for one or more embodiments, the second helicopter system can include a data storage unit to electronically store data from the first helicopter system regarding flight data of the first helicopter, the flight data including one or more of a flight path, a velocity, an attitude, an orientation, a time, and a location of the first helicopter in relation to the fired unguided energetic projectile. Optionally, the association of the fired unguided energetic projectile and the flight data of the first helicopter may be with respect to a determined location or location area of an origin of the fired unguided energetic projectile, the determined location or location area being determined by the image processor of the first helicopter and transmitted via the transmitter of the first helicopter system to the second helicopter system.

Optionally, the second helicopter system can include: an infrared (IR) camera mounted to the second military helicopter, the IR camera having a field of view (FOV) and a predetermined sensitivity sufficient to capture a heat signature of the fired unguided energetic projectile, the heat signature including at least one of a firing component generated upon firing of the projectile, a tracer-related component associated with projectile pyrotechnics, and a friction component, pixels of the IR camera being operative to capture a portion of a trail of energy associated with the heat signature of the fired projectile, the captured portion of the trail of energy being a two-dimensional representation over time of a portion of the trajectory of the fired projectile; and an image processor located on board the second helicopter and operative to receive signals from the IR camera corresponding to the captured portion of the trail of energy, the processor being operative to post-process in near real time the signals from the IR camera and to make a determination as to whether the second helicopter was the intended target of the fired projectile by analyzing the relationship of the captured portion of the trail of energy with respect to the FOV of the IR camera; and a transmitter to transmit to the first helicopter system signals indicating that the second helicopter is subject to hostile fire. The first helicopter system can be operative to determine a location or location area of an origin of the fired unguided energetic projectile based on the post-processed signals from the IR camera of the first helicopter system and from the post-processed signals from the IR camera of the second helicopter system received by the first helicopter system. Additionally, the second helicopter system can be operative to determine the location or location area of the origin of the fired unguided energetic projectile based on the post-processed signals from the IR camera of the second helicopter system and from post-processed signals from the IR camera of the first helicopter system received by the second helicopter system.

One or more embodiments of the present invention also include a non-transitory computer readable storage medium having stored thereon software instructions that, when executed by a processor, cause the processor to perform operations comprising: receiving signals indicative of whether or not a second vehicle, remotely located with respect to a first vehicle having the processor, is an intended target of a fired projectile, for example, a fired, ground-based projectile, the received signals being based on a thermally sensed travel path portion of the fired projectile with respect to a FOV of a focal plane array (FPA); and electronically processing the received signals. Optionally, the electronically processing includes storing data corresponding to the received intended target signals in an electronic storage medium, the stored data indicating one of a miss distance of the fired projectile or hit data with respect to the second vehicle.

For one or more embodiments, the electronically processing the received signals can cause the processor to perform one or more of the following operations: output a signal to cause a visual alert, output a signal to cause an audible alert, output a signal to activate a tactile display (e.g., a matrix of vibrating or buzzing elements in a vest, a seat, etc.), output a signal to activate a countermeasure system, output a signal to transmit data regarding whether or not the second vehicle is the intended target of the fired projectile to another vehicle, output a signal to cause a visual instruction (e.g., in virtual or hologram form or on a visual display, such as a heads-up display (HUD), and output a signal to cause an audible instruction.

Optionally, the electronically processing the received signals may include determining a location of origin for the fired projectile. Additionally, optionally, the processor may be operative to perform operations comprising: receiving signals indicative of whether or not one or more additional vehicles remotely located with respect to a first vehicle having the processor, other than the second vehicle, are intended targets of fired projectiles, the received signals being based on a thermally sensed travel path portion of the fired projectile with respect to a field of view (FOV) of a focal plane array (FPA); and electronically processing the received signals.

Additionally, one or more embodiments of the invention can include a helicopter maintenance system that is operative to determine whether the helicopter, while in flight, was hit or was likely hit by a fired unguided energetic projectile and the position or likely position on the helicopter where the projectile hit or likely hit. Such determination can be used as part of an in-flight damage indication and assessment system. Optionally or alternatively, such determination can be used as part of a post-flight maintenance damage indication and assessment system. The system can comprise: an infrared (IR) camera mounted to the helicopter, the IR camera having a field of view (FOV) and a predetermined sensitivity sufficient to capture a heat signature of the fired unguided energetic projectile, the heat signature including at least one of a firing component generated upon firing of the projectile, a tracer-related component, and a friction component, pixels of the IR camera being operative to capture a portion of a trail of energy associated with the heat signature of the fired projectile, the captured portion of the trail of energy being a two-dimensional representation over time of a trajectory portion of the fired projectile; an image processor located on board the helicopter and operative to receive signals from the IR camera corresponding to the captured portion of the trail of energy, the processor being operative to post-process the signals from the IR camera and to make a determination as to whether the fired projectile hit or likely hit the helicopter and the position or likely position on the helicopter where the projectile hit or likely hit the helicopter by analyzing the relationship of the captured portion of the trail of energy with respect to the FOV of the IR camera, and an electronic data storage device to store data regarding projectile hit position or likely hit position on the helicopter, the electronic data storage device being accessible when the helicopter is not in flight. Optionally, the system can comprise an alert system operatively coupled to the image processor to generate timely audible and/or visible indications that the helicopter was hit or was likely hit by the fired projectile.

In one or more embodiments, the stored data regarding projectile hit position or likely hit position on the helicopter may be retrievable for performance of a post-flight inspection. Optionally, the electronic data storage device can be accessible by ground crew maintenance personnel. Optionally or alternatively, the stored data may be for in-flight damage assessment. The accessing the electronic data storage device by the ground crew maintenance personnel may include displaying of a diagram of the aircraft (e.g., a helicopter) on a display screen and showing indicia on the diagram representative of one or more hit or likely hit positions on the helicopter. Further, the position or likely position on the helicopter is a zone of the helicopter. Optionally, the unguided energetic projectile is any one of a rocket-propelled grenade (RPG), anti-aircraft artillery (AAA), and small arms fire.

In one or more embodiments of the invention, the system is configured and operative to capture and process multiple projectile signatures (e.g., heat or infrared light signatures) from multiple fired projectiles and to determine whether any of the fired projectiles hit or likely hit the helicopter and the corresponding positions or likely positions on the helicopter where any of the projectiles hit or likely hit. Hit or likely hit data from accessing the electronic data storage device may be for providing a map of the helicopter showing any of one or more hit or likely hit positions of fired projectiles with respect to the helicopter. Further, the map may include more than one view of the helicopter and corresponding any of one or more hit or likely hit positions. Thus, in one or more embodiments, hit probability data can be produced. Such data can used in-flight for damage estimates and/or for probability of hit assessment.

Further, included among one or more embodiments also is a method for indicating damage caused by a fired projectile, comprising: electronically detecting infrared radiation of a projectile in a field of view (FOV); electronically determining a travel path of the projectile based on the electronically detecting infrared radiation of the projectile in the FOV; responsive to the electronically determining a travel path, generating probabilistic data regarding likelihood of the projectile hitting a vehicle associated with the FOV; and generating an indication based on the probabilistic data. The indication may be an audible and/or a visual warning to an operator of the vehicle warning the operator to control the vehicle so as to take evasive action. Further, optionally, the indication may also be a tactile display, for instance, an individual or a matrix of vibrating or buzzing elements in a vest, a seat, etc.

Optionally, the probabilistic data can indicate that the vehicle was likely hit, the likely hit probabilistic data being indicated by a hit probability that exceeds a threshold amount. Optionally or alternatively, the probabilistic data indicates that the vehicle will likely be hit, the likely hit probabilistic data being indicated by a hit probability that exceeds a threshold amount. Optionally or alternatively, the probabilistic data is indicative of the projectile hitting or likely hitting the vehicle, and the indication is for an air or a maintenance crew member indicating that the helicopter was hit or was likely hit and an approximation or estimation of where the helicopter was hit or was likely hit for post-flight inspection and repair. The probabilistic data may also be used for in-flight damage location indication and assessment.

In one or more embodiments of the invention, a nontransitory computer readable storage medium having stored thereon software instructions that, when executed by a processor, can cause the processor to perform operations comprising: analyze received electronic data regarding any sensed heat signatures of small arms fire sensed in a predetermined sensing zone; determine any hit locations or probably hit locations of small arms fire based on estimations of associated paths of the small arms fire with respect to a focal plane array; and electronically store data corresponding to any determined hit locations or probably hit locations for later retrieval and analysis. The received electronic data may be in terms of one or more functions of time of a flying vehicle and/or one or more functions of velocity of the flying vehicle and/or the velocity of the projectile, for instance.

Optionally, the instructions, when executed by the processor, can cause the processor to perform operations comprising: responsive to a retrieval request, output the stored data corresponding to any determined hit or probable hit locations for later retrieval and analysis, the stored data being transformed so as to provide on a display device a visual diagrammatic representation of the flying vehicle and any determined hit locations or probably hit locations to the flying vehicle. Further, optionally, the instructions, when executed by the processor, cause the processor to perform operations comprising: outputting on the display device a sequence of inspection instructions for each of the determined hit locations. Optionally, the display device is a hand-held display device.

Embodiments also include computer program products or non-transitory computer readable media that can perform some or all aspects or functionality of methods, circuitry, circuits, systems, or system components as set forth herein and according to embodiments of the disclosed subject matter.

BRIEF DESCRIPTION OF THE DRAWINGS

Embodiments of the invention will hereinafter be described in detail below with reference to the accompanying drawings, wherein like reference numerals represent like elements. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features.

DESCRIPTION

Figure 1:
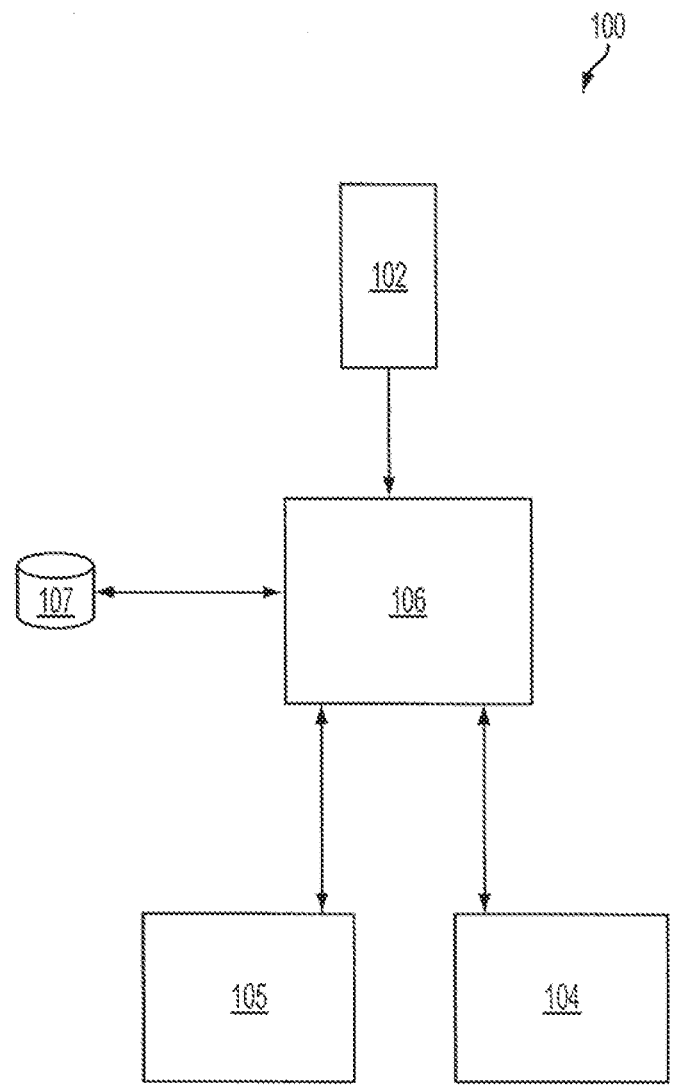
FIG. 1 is a block diagram of a system according to one or more embodiments of the invention.

The description set forth below in connection with the appended drawings is intended as a description of various embodiments of the invention and is not necessarily intended to represent the only embodiments in which the invention may be practiced. In certain instances, the description includes specific details for the purpose of providing an understanding of the invention. However, it will be apparent to those skilled in the art that the invention may be practiced without these specific details. In some instances, well-known structures and components may be shown in block diagram form in order to avoid obscuring the concepts of the disclosed subject matter.

Generally speaking, embodiments of the invention relate to systems, methods, and computer program products for identifying and indicating hostile fire. Embodiments of the invention also involve a network for identifying, indicating, and communicating (i.e., transmitting and receiving) hostile fire data, and systems, methods, and computer program products thereof. Further, one or more embodiments of the invention involve hostile fire damage assessment systems, methods, and computer program products, for instance, for in-flight and/or post-flight damage indication and assessment.

Hostile fire may include fire directed or aimed at a particular vehicle. Thus, embodiments of the invention can provide the ability to not only positively detect the firing of projectiles in the vicinity of a vehicle, but also to determine whether the projectile associated with the detected firing is approaching the vehicle and optionally is a threat to the vehicle. Further, optionally, hostile fire may include a situation where a projectile trajectory is determined to pass within a predetermined distance away from the vehicle. Optionally, hostile fire may include a situation where it is determined that the projectile will/will likely or has/has likely hit the vehicle. Hostile fire, optionally, may include a situation where it is determined that the projectile is threatening/likely threatening or lethal/likely lethal, the latter of which not necessarily indicating downing or substantially total destruction or incapacitation of the vehicle. Accordingly, one or more embodiments of the invention can distinguish between hostile fire and friendly fire, fire from an enemy combatant not aimed at the vehicle, or fire otherwise non-threatening or lethal to the vehicle, for instance, if the projectile is not likely to hit the vehicle or outside its lethal range.

A vehicle or vehicles according to one or more embodiments of the invention can include a helicopter, an airplane, an unmanned aerial vehicle (UAV), or a land-based vehicle, such as a tank or a high mobility multipurpose wheeled vehicle (HMMWV). In an alternative embodiment, the "vehicle" may be substituted for by a person, and the system, method, or computer program product according to one or more embodiments of the invention can determine whether the person is the intended target or likely target of hostile fire.

Hostile fire detectable according to one or more embodiments of the invention can be ballistic or energetic projectiles, including one or more of each of a rocket-propelled grenade (RPG) in a ballistic phase of its trajectory, for instance, anti-aircraft artillery (AAA), and small arms fire (e.g., from an automatic rifle), for example. The foregoing, of course, are non-limiting examples. The small arms fire may or may not have a tracer-related component. Thus, in embodiments of the present invention, hostile fire from small arms fire not having a tracer component may be detected and identified. For example, a single-shot bullet not having a tracer component may be detected and identified, for instance, using only one optical detector, sensor, or receiver according to one or more embodiments of the present invention.

FIG. 1 is a block diagram a system 100 according to one or more embodiments of the invention. System 100 can be implemented in a vehicle, such as a helicopter 200 (See, e.g., FIGS. 2A and 2B). Incidentally, helicopter 200 may be a military helicopter, a law enforcement or private security helicopter, or a civilian helicopter (e.g., flying in a restricted area and possibly subject to hostile fire). Of course, system 100 may be implemented with other aircraft, such as an airplane, a jet, a glider, an unmanned aerial vehicle (UAV), a blimp, or the like. Further, in one or more embodiments, system 100 can be implemented in land- or water-based vehicles, such as trucks, tanks, hovercrafts, or the like. As indicated above, system 100 may be implemented onboard a person (e.g., a soldier). System 100 can be operative and effective during day and night conditions, for instance.

System 100 can include a threat detection and identification subsystem 102, a communication subsystem 104, an information output subsystem 105, and a controller 106. In one or more embodiments of the invention, one or more components of the system 100 can be implemented in components already installed on the vehicle and may not require any additional hardware.

Threat detection and identification subsystem 102 can include an optical detector, sensor, or receiver, such as a thermographic camera or infrared (IR) camera, also called a focal plane array (FPA). The optical detector can have a field of view (FOV), for instance, 100 to 105 degrees, and sensitivity sufficient to capture firing signature(s) of fired projectile(s). Optionally, the optical detector/sensor/receiver may be the only one of such detectors on the vehicle, and threat detection and identification may be performed based on data input to or received by the single optical detector only. Alternatively, the threat detection and identification subsystem 102 may include more than one optical detector/sensor/receiver, but still the threat detection and identification may be performed based on data input to or received by only one of the single optical detectors.

Firing signature can be a heat signature of the projectile sensed by the FPA. Further, the heat signature can represent a portion of the projectile trajectory, wherein portion can be an entire portion thereof from origination (e.g., muzzle flash) to where the projectile leaves the FOV or hits the FPA; a portion from a predetermined distance away from the vehicle (e.g., 100 or 200 meters away) to where the projectile leaves the FOV (or hits the FPA) and not the muzzle flash; a portion from the muzzle flash and then not again until the projectile is a predetermined distance away from the vehicle (e.g., 100 or 200 meters away) to where the projectile leaves the FOV (or hits the FPA); and a portion from where the projectile enters the FOV to when it leaves the FOV. Thus, portions of the heat signature can include infrared radiation in the form of one or more of a firing component generated upon firing of the projectile (e.g., a muzzle flash), a tracer-related component associated with projectile pyrotechnics, and a friction component generated by friction as the projectile travels through the troposphere (e.g., a heat trail). The friction component, for instance, may not be "visible" by the FPA until it is a predetermined distance away from the FPA. Further, the trail may be substantially straight lined or have straight line portions, or it may be curved or have curved portions (e.g., arc or parabolic). Pixels of the FPA are operative to capture a portion of a trail of energy corresponding to the portion of the heat signature of the fired projectile. The captured portion of the trail of energy is a two-dimensional representation over time of a three-dimensional trajectory of the fired projectile projected onto the FPA.

As will be discussed in more detail below, threat detection and identification subsystem 102 can include more than one optical detector, such as two, four, eight, or more optical detectors. Each of the optical detectors can have their own FOVs (of same or differing FOVs as other optical detectors) to form a total FOV. The FOVs can form a total FOV for the threat detection and identification subsystem 102, for instance, for 180 degrees of coverage. Optionally, some or all adjacent FOVs may overlap, for example, by five to ten degrees. Further, one or more of the FOVs may be moved, for example, mechanically by physically moving a portion of the corresponding optical detector, or electronically, via software, for instance. Further, one or more of the FOVs may be modified, for instance, expanded or contracted, extended or withdrawn, widened or narrowed, and/or turned on or turned off.

Optionally, system 100 can also comprise one or more additional threat detection and/or identification subsystems, including a shock wave front detection subsystem, a microphone array subsystem, an electrostatic environment detection subsystem, a radar detection subsystem, and a muzzle flash detection subsystem. For example, threat detection and identification subsystem 102 may be operative with a separate muzzle flash detection subsystem, whereby the muzzle flash detection subsystem can cue the threat detection and identification subsystem 102 to determine whether the fired projectile is hostile or not. Thus, one or more algorithms associated with the threat detection and identification subsystem 102 may work with one or more algorithms associated with one or more of additional threat detection and/or identification subsystems, such as a separate muzzle flash detection subsystem. Optionally, one or more algorithms associated with the threat detection and identification subsystem 102 may be "on" the same optical detector, sensor, or receiver as one or more additional algorithms associated with muzzle flash detection. Optionally or alternatively, system 100 may include only IR detection components for the threat detect and identification subsystem 102 and not the aforementioned shock wave front detection subsystem, microphone array subsystem, electrostatic environment detection subsystem, and radar detection subsystem, in order to detect and identify hostile fire regarding the vehicle.

Controller 106 can be a processor, for instance, an image processor, located onboard a vehicle associated with system 100. Generally speaking, the controller 106 can execute computer executable instructions running thereon or provided from an external source, from internal and/or external memory. Controller 106 can be implemented on one or more general purpose networked computer systems, embedded computer systems, routers, switches, server devices, client devices, various intermediate devices/nodes and/or stand-alone computer systems. Controller 106 can be a computerized controller or microcontroller with a processor or processors. Further, controller 106 can include and/or be coupled to volatile and non-volatile memory 107. Dual microprocessors and other multi-processor architectures can also be utilized as the processor. The processor(s) and memory 107 can be coupled by any of several types of bus structures, including a memory bus or memory controller, a peripheral bus, and a local bus using any of a variety of bus architectures. The memory 107 can include read only memory (ROM) and random access memory (RAM), for instance. Optionally, controller 106 or system 100 in general can include one or more types of long-term data storage units. The long-term data storage can be connected to the controller 106 by an interface. Optionally or alternatively, some or all of the data storage may be internal of the controller 106 and can be coupled to the processor(s) by a drive interface or interfaces. The long-term storage components can provide nonvolatile storage of data, data structures, and computer-executable instructions for the controller 106 and more specifically the processor(s) of the controller 106. A number of program modules may also be stored in one or more of the drives as well as in the RAM, including an operating system, one or more application programs, other program modules, and program data.

Controller 106 can be operative to receive signals from the threat detection and identification subsystem 102. Optionally, controller 106 can receive signals from one or more additional threat detection subsystems as set forth herein. Further, optionally or alternatively, threat detection and identification subsystem 102 may have a processor, for example, an image processor, to perform some or all of the post-detection processing and send corresponding data signals to controller 106.

The controller 106 can be operative to post-process in substantially real time or near real time, for instance, signals from the threat detection and identification subsystem 102 (and optionally one or more additional threat detection subsystems) and to determine whether a fired trajectory is hostile with respect to the corresponding vehicle of system 100. Optionally, controller 106 can determine whether the vehicle was hit or likely hit based on signals from the threat detection and identification subsystem 102 (and optionally one or more additional threat detection subsystems).

In the case of received signals from an FPA (or optionally multiple FPAs), these signals can correspond to the captured portion(s) of a trail of energy associated with the projectile heat signature. Based at least on those signals, the controller 106 may determine whether the projectile is hostile or not.

Controller 106 can also provide data, such as control data, to threat detection and identification subsystem 102. Further, controller 106 can receive data from and send data to vehicle-specific subsystems, such as navigation, flight control, audio and/or visual, weaponry, and countermeasure subsystems (not expressly shown), as well as communication subsystem 104 and an information output subsystem 105, and, optionally, any of such data may be provided to the threat detection and identification subsystem 102 in order perform processing or calculations for its detection and identification of hostile fire.

Communication subsystem 104 can be a communication system for communicating data to and from one or more locations remote from the system 100 and the corresponding vehicle. Communication subsystem 104 can send and/or receive data in one or more of omni-directional format or directed format. Corresponding receivers and transmitters and associated components and circuitry (e.g., filters, tuners, antennas, etc.) can be employed. In one or more embodiments, the communication subsystem 104 is onboard the vehicle and can send hostile fire detection and/or indication data as set forth herein to one or more other vehicles (e.g., another helicopter) in a network of vehicles. Such hostile fire detection and/or indication data can be used by the other vehicle(s) to take appropriate actions, such as rerouting, deploying countermeasures, deploying weapons systems, and/or determining a location of and/or distance to the origination of the hostile fire.

Information output subsystem 105 can represent multiple output subsystems. For example, information output subsystem 105 can include an alert, warning, or indication (e.g., visual, audible, and/or tactile) to occupants of vehicle that the vehicle is an intended target of a fired weapon and/or that the projectile is potentially damaging or lethal, for instance, based on detected projectile characteristics. Further, the type of weapon associated with the projectile may also be indicated. A visual alert or warning may be displayed on a computer screen or a heads up display (HUD) of the vehicle, for instance. The tactile display may be an individual or a matrix of vibrating or buzzing elements in a vest or a seat, for instance, of a pilot and/or copilot. Such alert, warning, or indication can be used to take appropriate actions, such as rerouting, deploying countermeasures, and/or deploying weapons systems of the vehicle. Further, in one or more embodiments, information output subsystem 105 can be for post-trip activities, such as to analyze characteristics of a mission (e.g., a location where the vehicle experienced hostile fire) or for inspection or maintenance purposes. For example, hostile fire data, such as a location or an area on the vehicle where hostile fire hit or likely hit the vehicle can be displayed so maintenance personnel can perform inspections and/or maintenance to the location or area or associated components. In-flight damage assessment also may be performed based output(s) of information output subsystem 105.

System 100 may determine projectile miss distance, and based on the miss distance, i.e., whether the projectile is a predetermined or predefined distance away from the corresponding vehicle associated with system 100, system 100 can determine and indicate that the projectile is hostile. Vertical and/or horizontal miss distance may be determined. Further, optionally, system 100, for instance, controller 106, also may calculate statistical or probabilistic data regarding a hit or likely hit to the vehicle by the projectile based on the data from the threat detection subsystem 102.

As indicated above, IR camera(s) or FPA(s) may be included as part of the threat detection and identification subsystem 102 and can be used to measure projectile miss distance, for instance, indirectly. Regarding IR cameras or FPAs, these devices can "see" "angle space." That is, the pixels of the FPA can be mapped to angles in the FOV of the FPA. Further, tracks of the FPA can be analyzed to calibrate the FPA and set a threshold or thresholds based on known velocities or velocity ranges of projectiles and corresponding distance ranges, for example, lethal or threatening projectile ranges. Optionally, constant or relatively constant velocity assumptions regarding projectiles and their corresponding caliber may be used. Further, because lethal or threatening ranges of projectiles are known, projectile data may be placed in caliber- and/or range-dependent bins for use in determining miss distance. For example, velocity (or estimated velocity) and range data for a fifty caliber projectile may be stored in a bin for later-use in determining miss distance of the projectile. As another example, for RPGs, which have a velocity profile dependent upon whether the propellant is active or not, the ballistic portion of the trajectory may be sorted out and such data can be stored in a corresponding bin for later use in determining miss distance of the projectile. System 100 may ascertain projectile data and put projectile data representing projectile characteristics in one or more bins. If the projectile was fired within its lethal or threatening range, its velocity can fall within the corresponding bin and therefore its minimum range was within the corresponding bin. Accordingly, because system 100 knows the velocity of the projectile, the projectile distance from the vehicle can be determined. Optionally, projectile data (e.g., velocity, trajectory profile, etc.) may be captured and stored by the FPA(s) for updating or creating new caliber- and/or range-dependent bins.

Figure 3A:
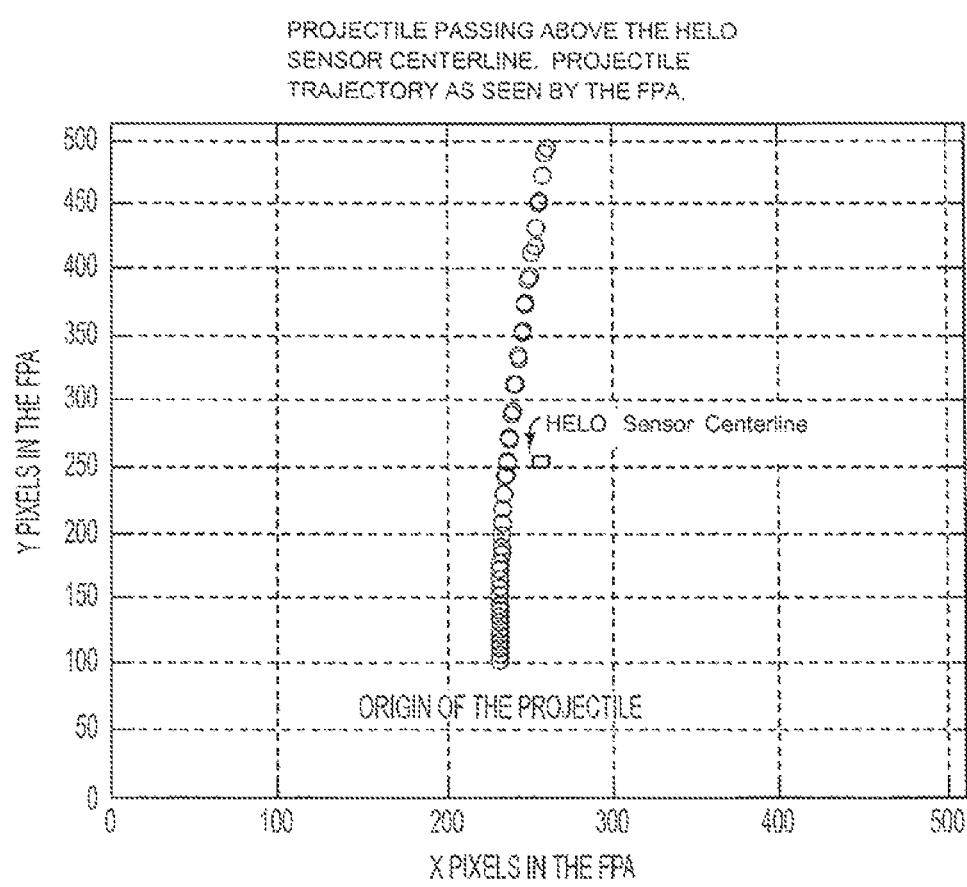
FIGS. 3A through 3C are graphs showing examples of projectile trajectory data.
Figure 3B:
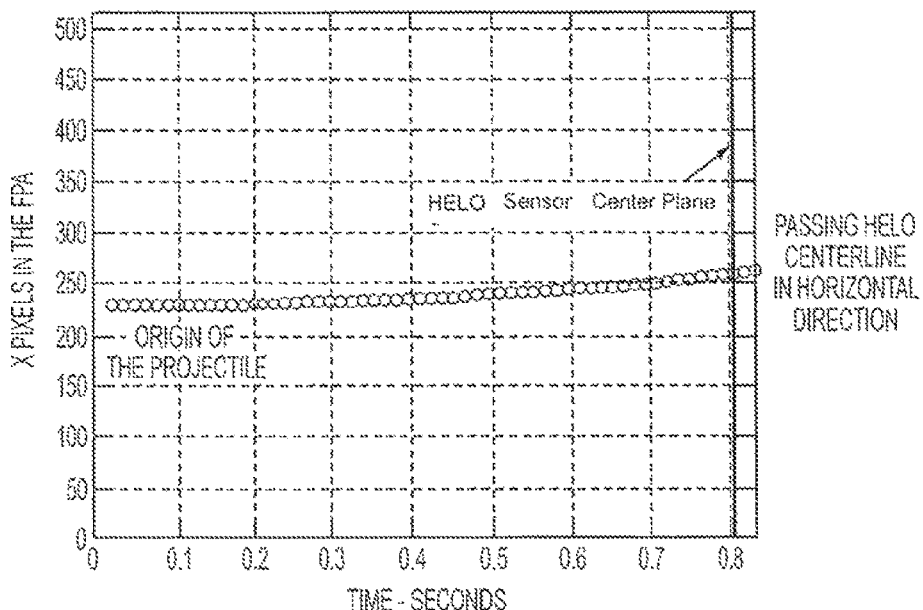
Figure 3C:
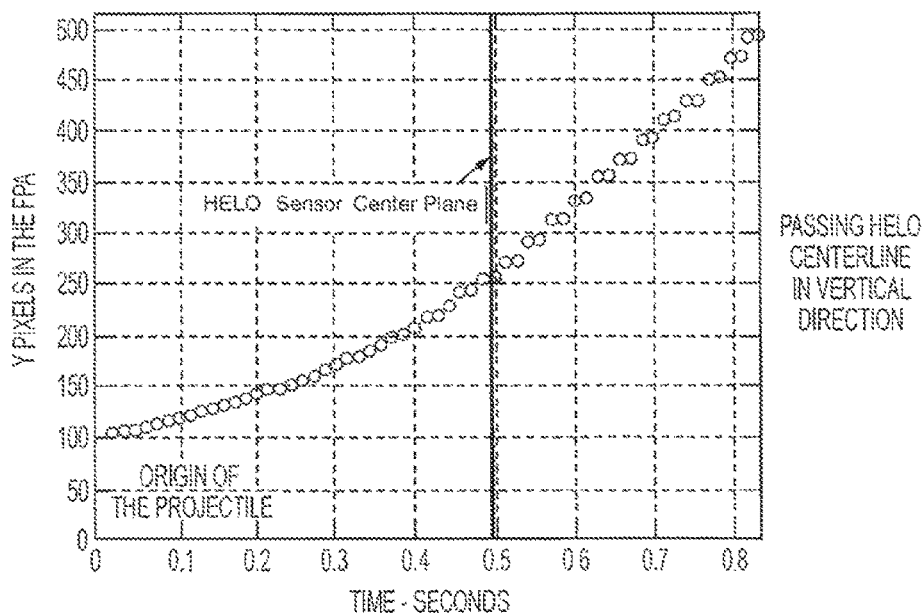

FIGS. 3A through 3C are graphs showing exemplary projectile trajectory data as seen by a focal plane array (FPA) according to one or more embodiments of the invention. FIG. 3A is representative of a projectile above the vehicle sensor centerline, a helicopter-mounted sensor in this example, FIG. 3B is a representation of cross-track trajectory (pixels vs. time) of the projectile passing the helicopter sensor centerline position HELO in horizontal direction, and FIG. 3C is a representation of vertical trajectory (pixels vs. time) of the projectile passing the helicopter sensor centerline position HELO in vertical direction. In the example shown in FIGS. 3A to 3C, the projectile trajectory is above the helicopter HELO sensor centerline. The vertical and/or horizontal miss distances of the projectile, as it passes the helicopter HELO sensor centerline, can be determined by analyzing both the horizontal and vertical pixel trail in the array as functions of time and projectile velocity, for instance. Optionally, though the velocity of the vehicle may be relatively small as compared to that of the projectile, vehicle velocity may also be factored in, for example "subtracted" from the pixel view. Optionally, the system may determine a direction of travel for each of the detected projectiles.

Miss distance may be measured or calculated based on the rate of change the projectile trace (first derivative) and the rate of rate of change of the projectile trace (second derivative) in the FPA, respectively represented by the following:

$$\left(\frac{\Delta\, pixels}{\Delta\, frames}\right) \text{ and } \left(\frac{\Delta^2\, pixels}{\Delta\, frames^2}\right)$$

The product of the foregoing terms can represent the miss distance, and if the product of these two terms is "high," then the bullet has passed close or even has or may have hit the vehicle.

$$\left(\frac{\Delta\, pixels}{\Delta\, frames}\right) * \left(\frac{\Delta^2\, pixels}{\Delta\, frames^2}\right)$$

The determined miss distance may be compared to a predetermined distance threshold, for instance by controller 110. If the determined miss distance is at or above the threshold, this can indicate that the projectile was aimed at or intended to hit the vehicle, for example. As will be discussed in more detail below, such an indication can cause further actions to be taken, such as outputting audible, visible, and/or tactile alerts, activating countermeasures or weapons, transmitting hostile fire data to a location or locations remote from the vehicle, providing instructions for rerouting or taking evasive action, determining a location or distance to the origination of the hostile fire, etc.

FIGS. 9A-9D and 10A-10D show data regarding projectile trajectory miss distance as seen from an FPA of a vehicle, also a helicopter HELO in these figures.

Figure 9A:
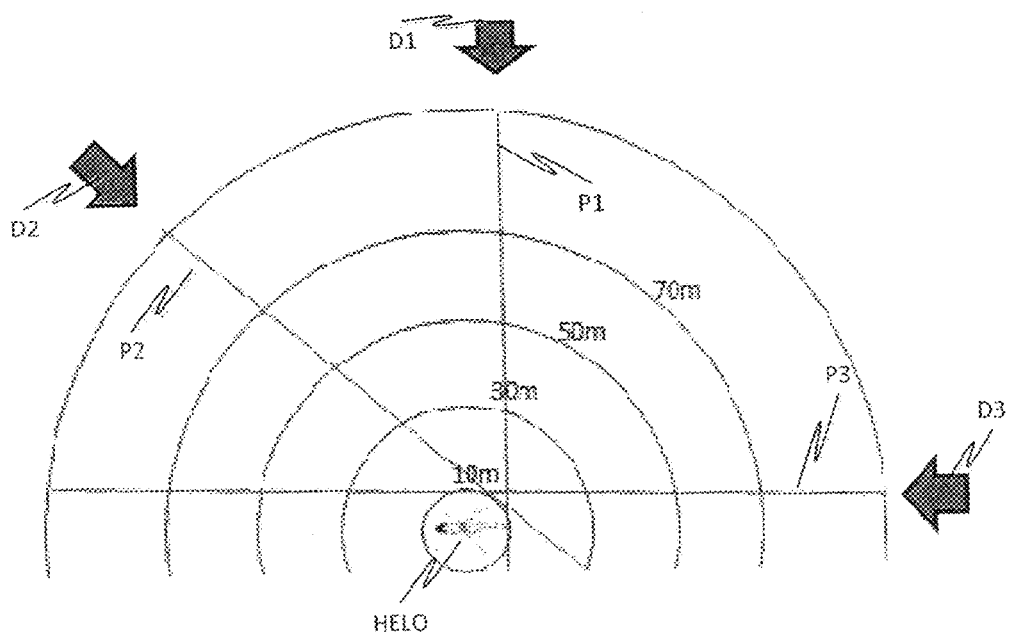
FIGS. 9A-9D and 10A-10D show data regarding different operational scenarios according to one or more embodiments of the invention.
Figure 9B:
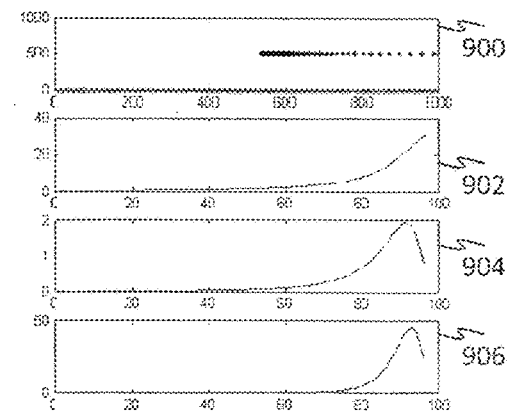

FIG. 9A shows trajectories associated with projectiles P1-P3 from different directions D1-D3, respectively, which cross a focal plane of an optical sensor onboard the vehicle, each of which at a closest distance away from the helicopter HELO of ten meters away. Similarly, FIG. 9B shows trajectories associated with projectiles P1-P3 from different directions D1-D3, respectively, which cross the focal plane, each of which at a closest distance away from the helicopter HELO of fifty meters. The concentric rings surrounding the helicopter HELO show distances away from the helicopter HELO, ten, thirty, fifty, seventy, and one hundred meters, respectively. Incidentally, for the scenarios in FIGS. 9A and 9B, the projectiles P1-P3 are visible to the FPA at one hundred meters out, the projectile velocity is one thousand meters/second, the FPA has one thousand pixels, and the frame rate of the FPA is one thousand FPS. The characteristics set forth in these scenarios, however, are merely examples and not intended to be limiting. For instance, the FPA may "see" the projectiles initially from distances greater than or less than one hundred meters out, the projectile velocity may be more or less than one thousand meters/second, the FPA may have more or less than one thousand pixels, for instance, and/or the FPA frame rate may be less than or greater than one thousand FPS.

Figure 9C:
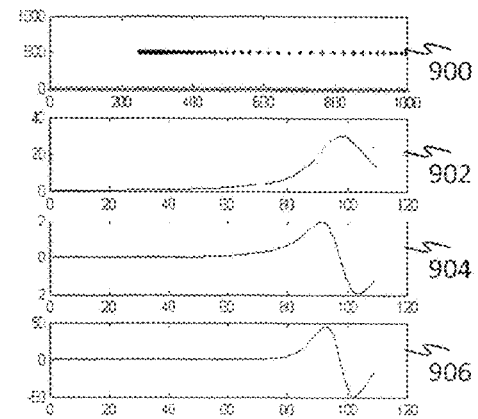
Figure 9D:
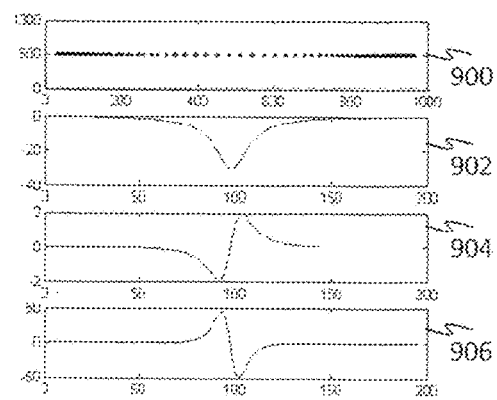
Figure 10A:
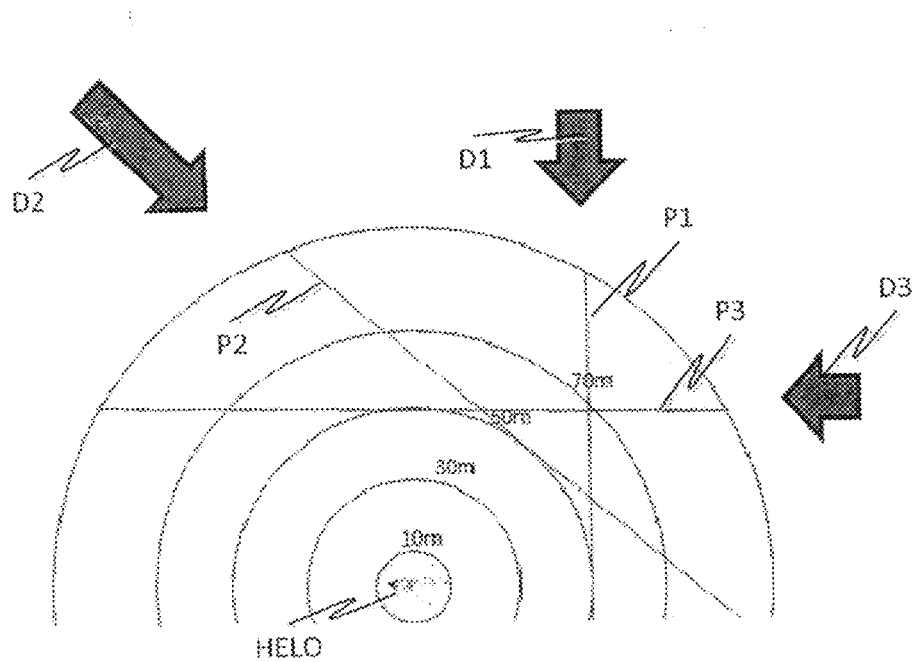
Figure 10B:
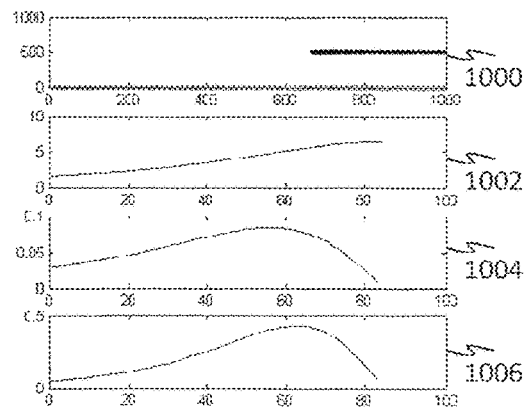
Figure 10C:
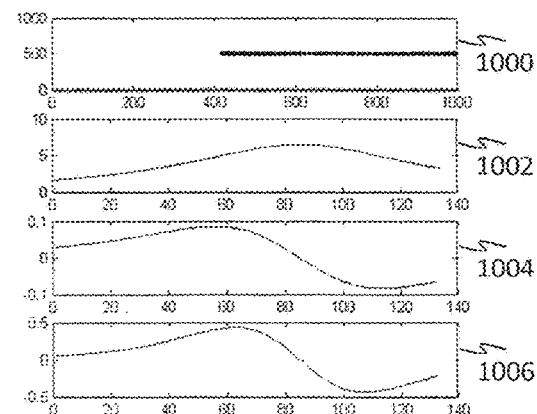
Figure 10D:
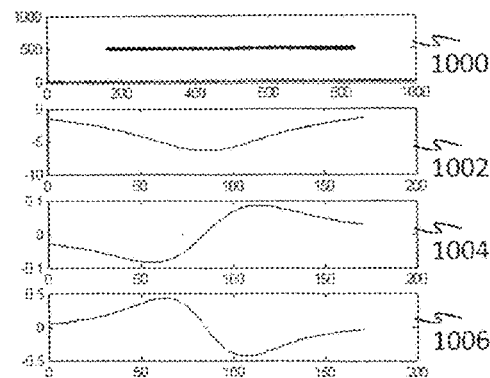

In FIGS. 9B, 9C, and 9D, the top graph 900 indicates the projectile trace on the FPA for each of the projectiles P1, P3, and P3 when the projectile miss distance is ten meters. Similarly, in FIGS. 10B, 10C, and 10D, the top graph 1000 indicates the projectile trace on the FPA for each of the projectiles P1, P3, and P3 when the projectile miss distance is fifty meters. Graphs 902, 904, 906 and 1002, 1004, 1006 show observed x-axis bullet traces, wherein 902/1002 represent projectile rate of change (first derivative), 904/1004 represent rate of rate of change (second derivative), and 906/1006 represent products of the two derivatives. The sign of the product indicates approaching or receding projectiles, wherein a positive sign means approaching and a negative sign means receding. As discussed above, the magnitude of the product indicates closest proximity within the FPA's FOV and is angle independent. In the case of FIGS. 9A-9D, the miss distance is ten meters and the corresponding product of the derivatives is forty five. In FIGS. 10A-10D, the miss distance is fifty meters and the corresponding product of the derivatives is 0.5, less than the previous value for a miss distance of ten meters.

Figure 2A:
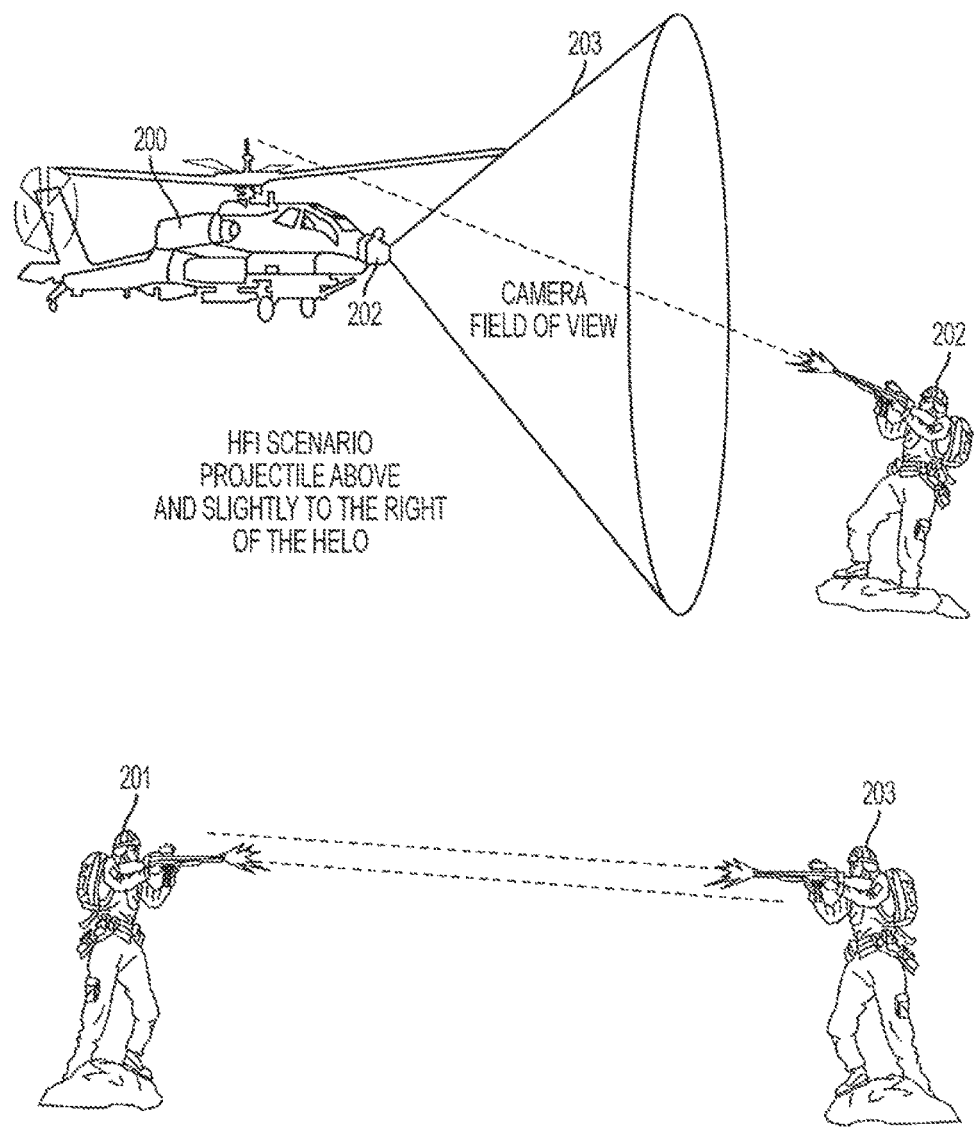
FIGS. 2A and 2B are operational depictions of systems, methods, and computer program products according to one or more embodiments of the invention.

Turning now to FIG. 2A, this figure shows an operational example of a system according to embodiments of the invention (e.g., system 100) on board a helicopter 200 outfitted with an IR camera 202 with an outwardly-directed field of view FOV 203. Actors 202 and 203 are enemy combatants, whereas actor 201 is a friendly. As can be seen in FIG. 2A, actor 202 is aiming at helicopter 200, but actors 201 and 203 are not (though actor 203 is indeed an enemy combatant). In this particular example, the system may detect and identify the firing from actor 202 as hostile. Further, even if fire from either actor 201 and/or 203 is detected for example, because the corresponding projectile travels in the FOV 203 of IR camera 202 and/or based on detection from another threat detection subsystem, the system may determine that such fire is non-hostile, because the fire is not aimed at helicopter 200, does not pass close enough to helicopter 200, or is not threatening or lethal to the helicopter 200, for example. Thus, although weapon firing and subsequent projectile trajectory for actors 201 and 203 are outside the IR camera FOV 203 in FIG. 2A, it may be the case that such firing or corresponding trajectories are inside the FOV 203, but because a comparison of the respective projectile trajectories indicates the projectiles will not hit or are not close enough to the helicopter 200, such projectiles are deemed non-threatening and therefore non-hostile. Further, a determination that the projectile is not in its damaging or lethal trajectory stage may also indicate that the projectile is not hostile (i.e., not threatening or lethal). Thus, though all three firings may be detected, the system can determine that only the projectile fired from actor 202 is hostile towards helicopter 200. Accordingly, the system can distinguish between hostile fire and non-hostile fire, as set forth herein. Additionally, as indicated above, one or more fire detection systems may be used in conjunction with the optical-based hostile fire detection and identification systems, methods, and computer programs products as set forth herein, such as systems that detect a shock wave front of a projectile, that using microphone arrays to detect projectile firing sounds, that analyze changes in electrostatic environment caused by the projectile around the vehicle, and that perform radar projection of the projectile.

Figure 2B:
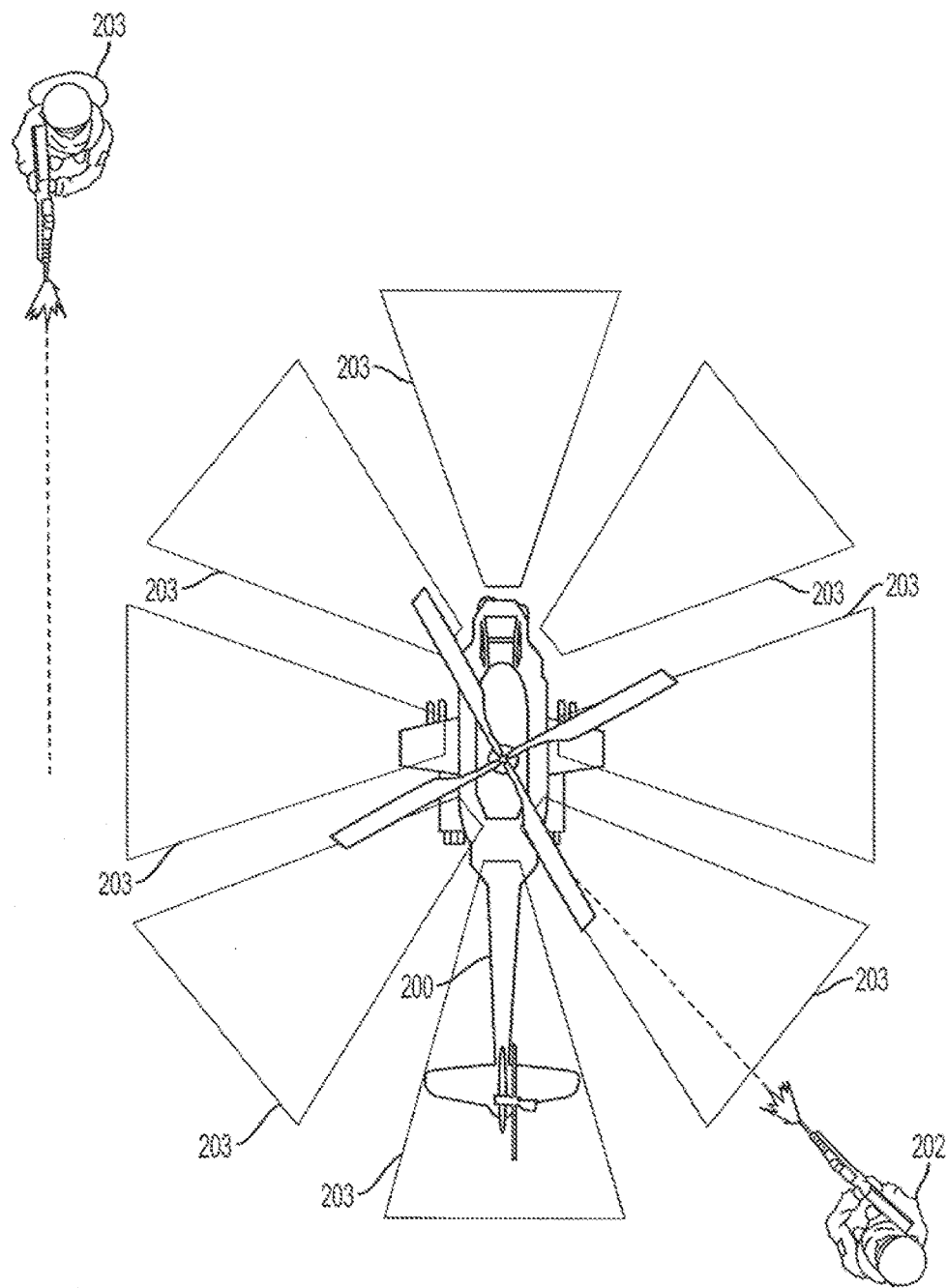

FIG. 2B shows a variation of the scenario in FIG. 2A. In FIG. 2B, helicopter 200 includes a system with eight optical sensors, for instance, IR sensors (e.g., IR cameras or FPAs), each with a corresponding FOV 203. Use of multiple sensors can provide a greater degree of protection, for instance, from hostile fire originating from behind helicopter 200. FIG. 2B shows that the optical sensors provided respective FOVs such that the cumulative FOV is 360 degrees or almost 360 degrees of coverage. Note further that FIG. 2B indicates that the FOVs do not overlap. However, optionally, one or more of the FOVs may overlap one or more adjacent FOVs. Further, note that the representation shown in FIG. 2B is only an example and more or less IR sensors and corresponding FOVs 203 than shown can be provided. For example, only four FPAs may be used, each having a FOV from 100 to 105 degrees, for instance, so as to cover or map 180 degrees around the vehicle. Thus, the pixels of the respective FPAs can be mapped to into directions based on the orientation of their respective FPA and corresponding FOV. Additionally, as indicated above, one or more fire detection systems may be used in conjunction with the optical-based hostile fire detection and identification systems, methods, and computer programs products as set forth herein, such as systems that detect a shock wave front of a projectile, that using microphone arrays to detect projectile firing sounds, that analyze changes in electrostatic environment caused by the projectile around the vehicle, and that perform radar projection of the projectile.

Not shown in the example of FIG. 2B, a projectile trajectory may be "seen" by multiple IR sensors. That is, the projectile trajectory may traverse through FOVs of multiple IR sensors. For example, a center pixel of an FPA may be aligned with the boresight of the helicopter 200 and may "pick up" a portion of the projectile trajectory. Another IR sensor, for instance, an FPA with its center pixel aligned ninety degrees offset from the boresight-aligned pixel of the foregoing FPA, may see the projectile trajectory differently. The location of both FPAs is relevant, because the projectile may pass within ten meters of one but twenty meters of the other (if the two are separated by ten meters), for example.

Providing multiple optical sensors may also be for the system to provide stereoscopic vision in effect, to determine hostile fire origination distance and/or to improve accuracy and fidelity. Optionally, projectile data associated with non-overlapping and/or overlapping FOVs may be automatically compared to enhance hostile fire indication accuracy. For example, a miss distance of a projectile associated with each FOV may be compared and (1) if one miss distance exceeds a predetermined threshold it is determined that the projectile is hostile (e.g., the corresponding vehicle is the intended target of the projectile) and/or (2) if the total of the miss distances is below a predetermined threshold, then the projectile is determined to be hostile. As another example, two IR sensors may be a known distance apart (e.g., ten meters). The differences in their displays may be used to determine an actual range to an origination location or location area for hostile fire. Thus, using known and captured velocity data associated with the projectile, the system may "trace back" to ground (including man-made structures) in order to determine the distance away and location or location area of the hostile fire. Optionally, captured muzzle flash data may be correlated with the captured projectile trajectory to determine the distance away and location or location area of the hostile fire.

Further, use of multiple optical sensors can inform the flight crew and/or maintenance personnel likelihood of the vehicle being hit by hostile fire. Such information can be provided in the form of a probability number, for example. Further, a location or location area of the hit may be provided. For example, an indication of hostile fire likely to have hit the vehicle can be provided relative to boresight (e.g., o'clock position) of the vehicle. Optionally, if the probability number does not exceed a predetermined threshold, the system may not provide an indication that the vehicle was likely hit by hostile fire. Hit information may be used for in-flight damage identification and assessment. Optionally or alternatively, hit information may be used for post-flight maintenance.

Accordingly, one or more embodiments of the invention can also include systems, methods, and computer program products for detecting identifying hostile fire strikes to a vehicle. The identification can be that the hostile fire will hit the vehicle, will likely hit the vehicle, hit the vehicle, and/or likely hit the vehicle. In the case of predictive hits, a warning or alert subsystem and/or countermeasure subsystem may be activated. In the case of actual or likely strikes to the vehicle, such strikes may go unnoticed by occupants of the vehicle, and a travel path of a detected projectile can be mapped to positions or areas on the vehicle, thus identifying a likely position or area of projectile impact. As indicated above, such data can be used for in-flight damage assessment as well as for post-flight inspection and maintenance purposes.

Figure 8:
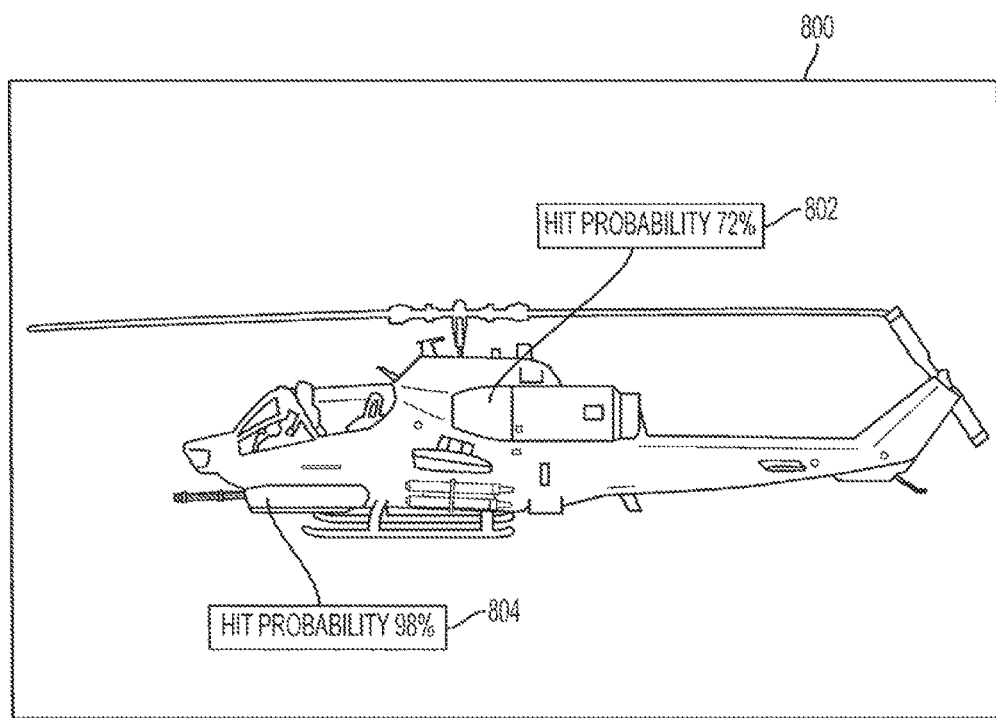
FIG. 8 is an example of a display according to a maintenance and/or inflight hit and damage assessment system, method, and computer program product according to one or more embodiments of the invention.

FIG. 8 shows an example of a display 800 providing hostile fire hit probability information. The display 800 can have indicia associated with the hit/likely hit location on the vehicle and also probability data, such as hit probability percentage. Thus, statistical or probabilistic data of a hit or likely hit can be used to generate an indication for air or maintenance crews that the vehicle was hit and an approximation or estimation of where the vehicle was hit or likely hit. Again, such data can be used by air and maintenance crews for damage assessment, inspection, and repair. Additionally, optionally, hit data can be used by vehicle crew or intelligence to retrace their travel pattern to determine where and/or when the vehicle was hit.

Optionally, in one or more embodiments of the invention, hostile fire can be detected and identified at a first vehicle and such determination can transmitted from the first vehicle to one or more other vehicles in a network. Information regarding the projectile may be sent to one or more locations remote from the vehicle, such as another vehicle in a network of vehicles. The projectile information can indicate to the remote location(s) that the first vehicle is experiencing hostile fire. Data regarding hostile fire relative to the first vehicle can be stored at one or more of the other vehicles and even retransmitted to other vehicles or base stations. Further, optionally, transmission of fire data can include only muzzle flash data. Fire data shared between platforms can be used to obtain initial or better accuracy regarding the fire and/or its location or location area of origination (e.g., a distance away). In embodiments, one vehicle may receive hit or likely hit data associated with another vehicle and store such data in memory. Accordingly, the one vehicle may store data regarding projectile impact locations or likely locations on the another vehicle. This data may be used to assist in identifying why the another vehicle was "downed."

Figure 7:
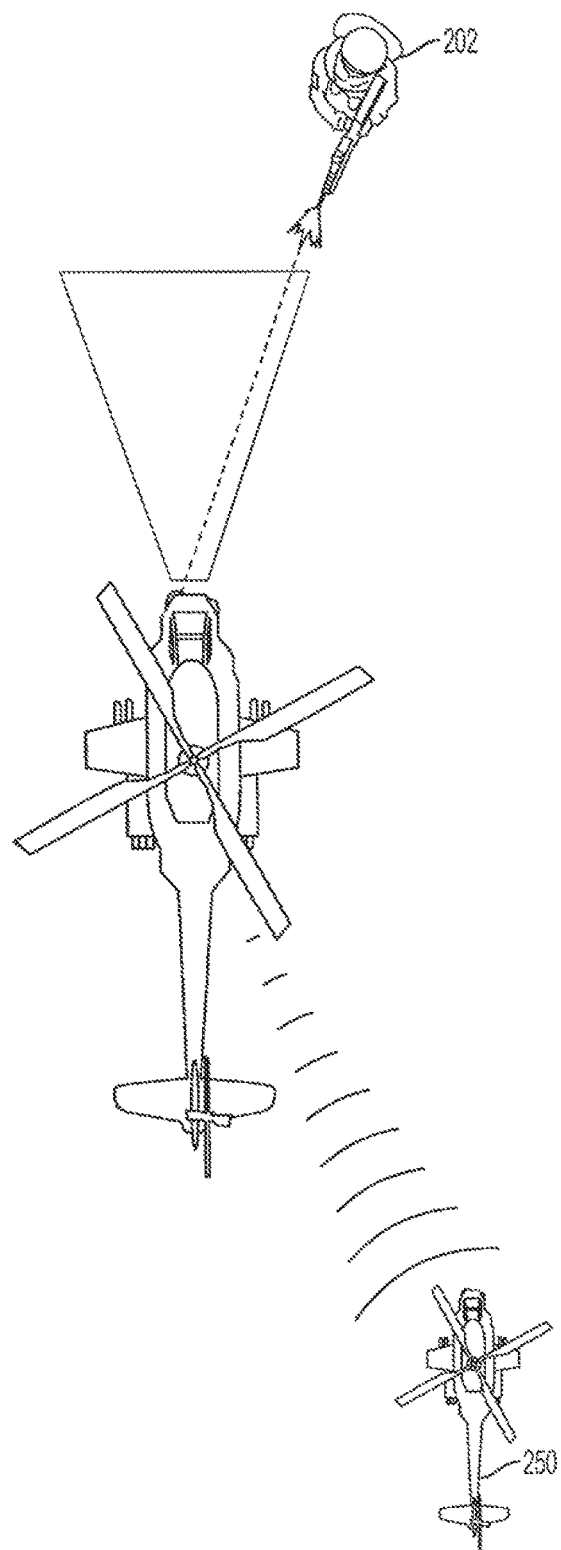
FIG. 7 is an operational depiction of a network and system, method, and computer program product thereof according to one or more embodiments of the invention.

FIG. 7 is an operational depiction of a network and system, method, and computer program product according to one or more embodiments of the invention.

Referring to FIG. 7, generally speaking, a first helicopter can determine that it is subject to hostile fire from actor 202 as shown and described herein and transmit such data to another helicopter 250 in a network. The second helicopter 250 can take appropriate action or actions without having to make its own hostile fire detection and determination, for example. Accordingly, optionally, the second helicopter may or may not need to be outfitted with the relatively heavy sensing equipment and can rely on another helicopter to indicate that they have entered a hostile zone. For helicopters both having this sensor equipment, geolocation of the hostile fire can be determined based on communications between the two systems.

Figure 4:
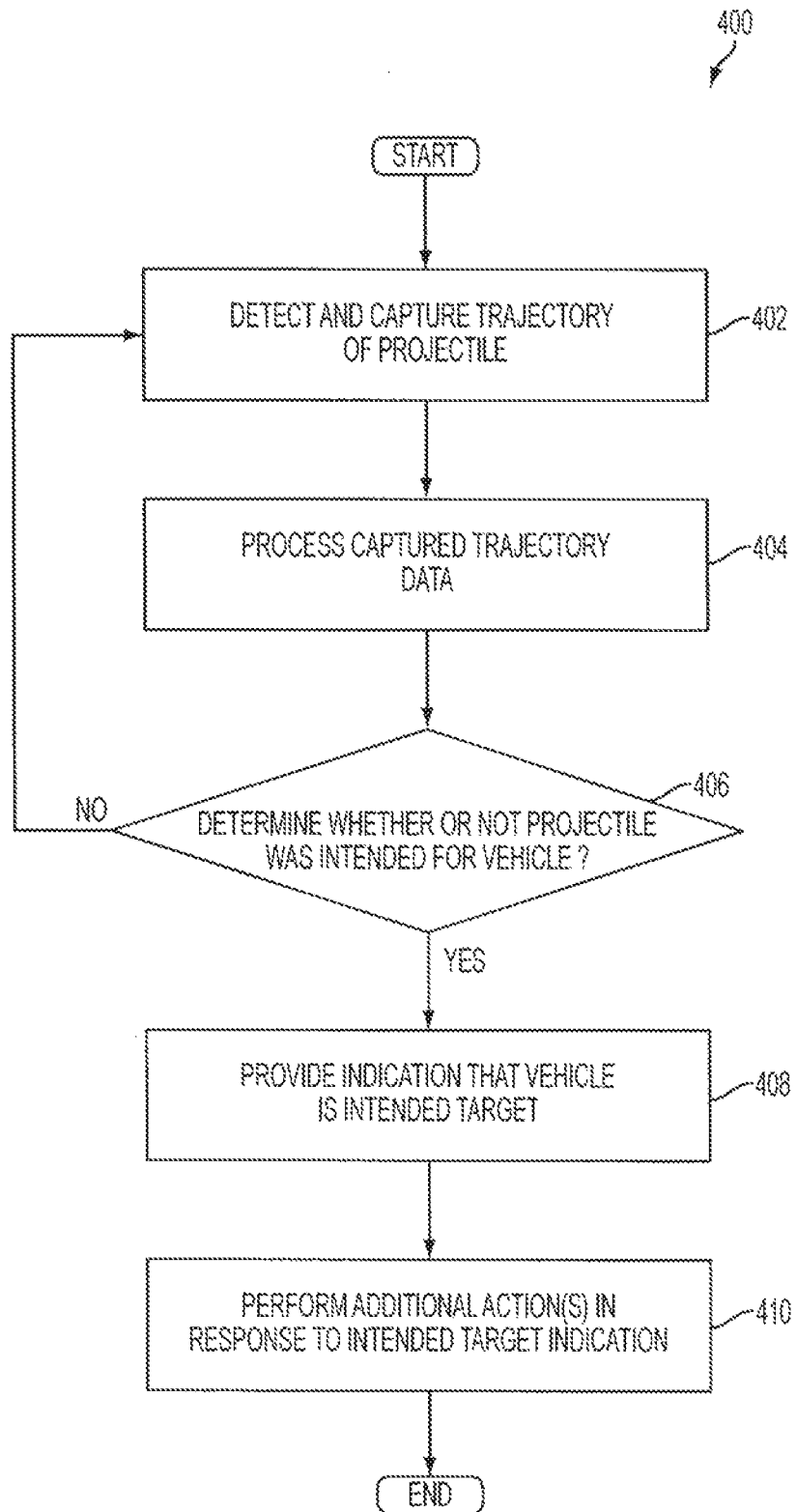
FIG. 4 is a flow chart for a method according to one or more embodiments of the invention.
Figure 5:
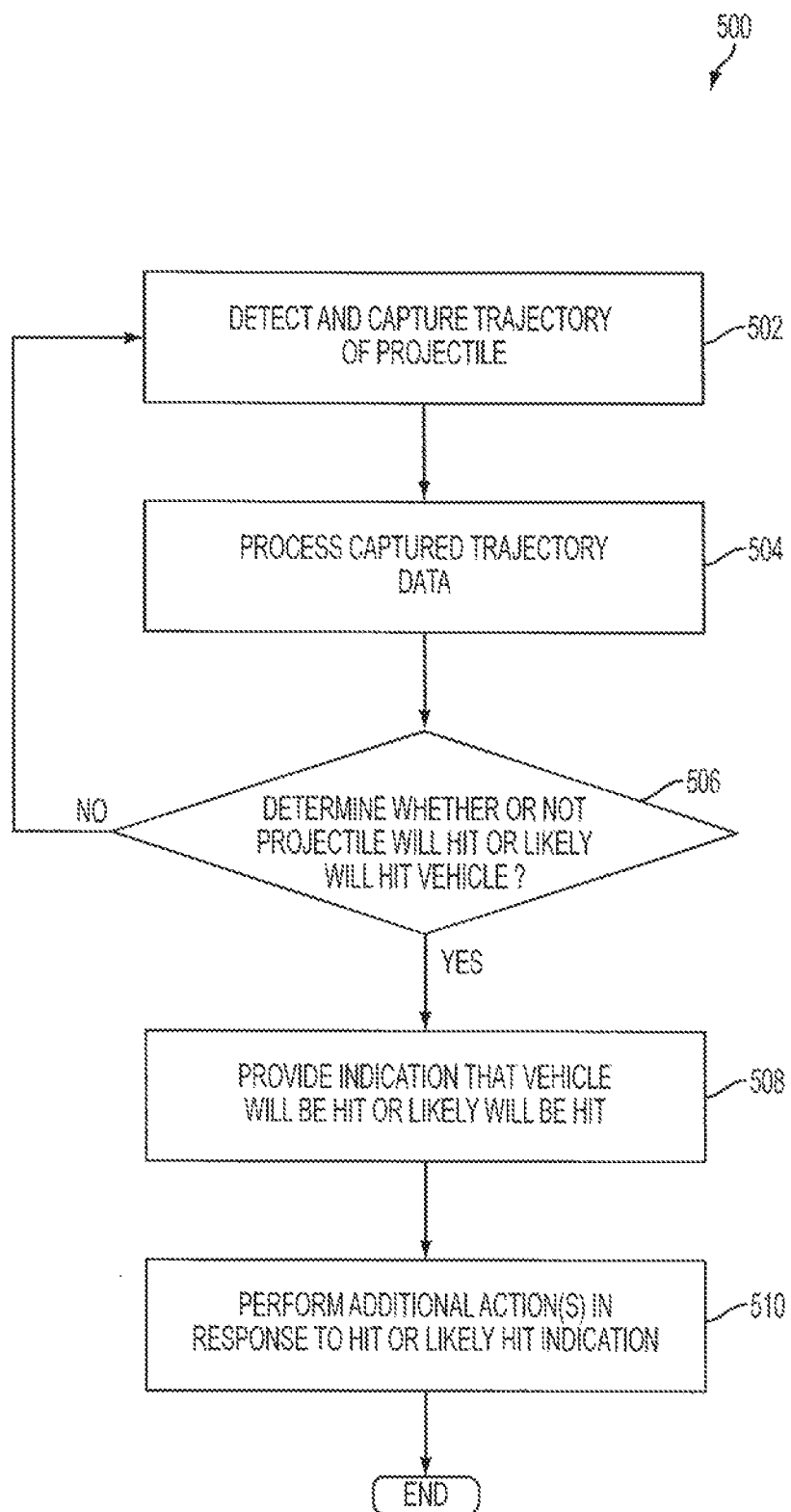
FIG. 5 is a flow chart for a method according to one or more embodiments of the invention.
Figure 6:
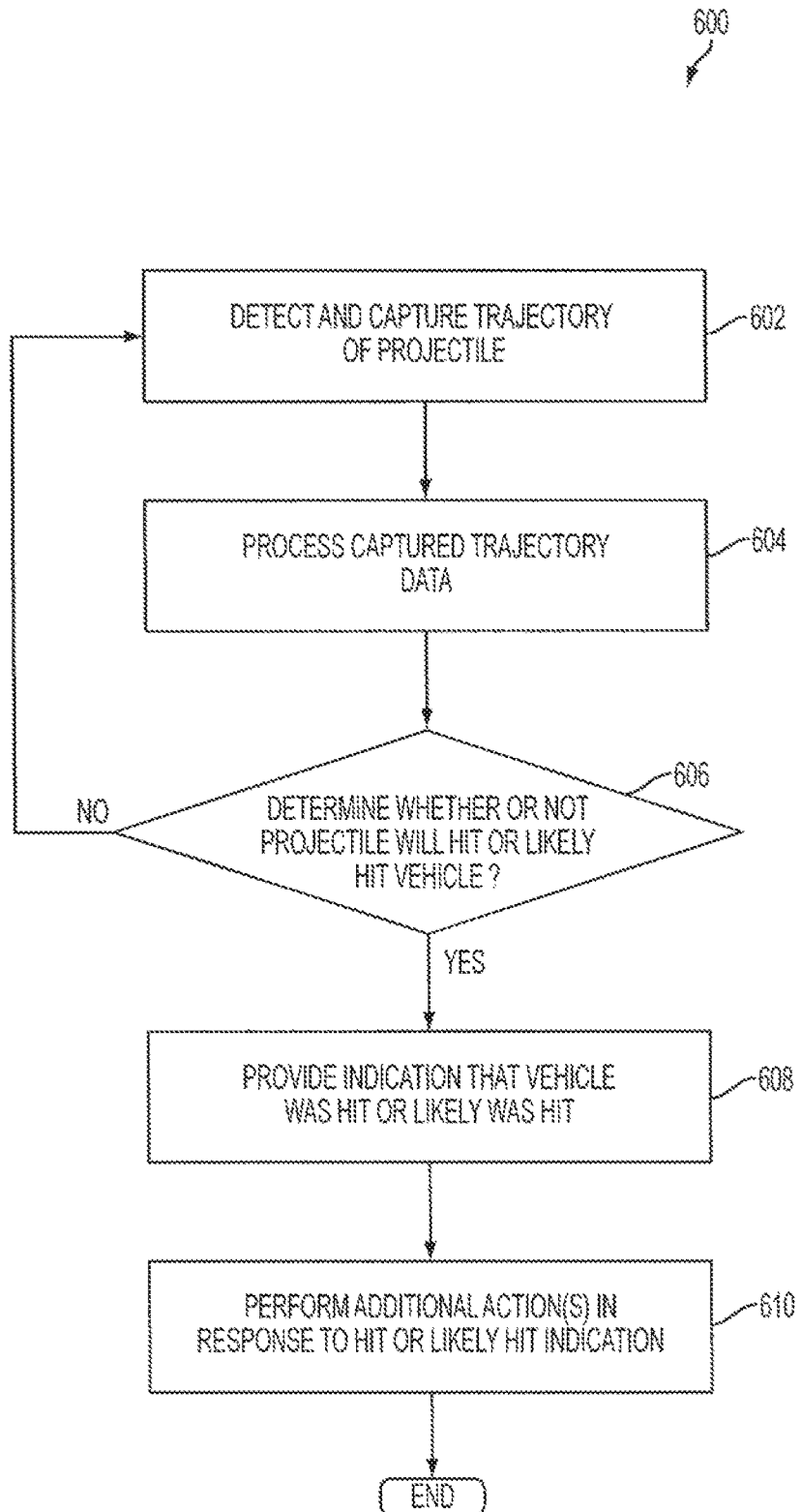
FIG. 6 is a flow chart for method according to one or more embodiments of the invention.

In view of the foregoing structural and functional features described above, methods 400, 500, and 600 in accordance with one or more embodiments of the invention will now be described with respect to FIGS. 4, 5, and 6. While, for purposes of simplicity of explanation, the methodologies of FIGS. 4, 5, and 6 are shown and described as executing serially, it is to be understood and appreciated that the invention is not limited by the illustrated order, as some aspects or steps could, in accordance with the present invention, occur in different orders and/or concurrently with other aspects from that shown and described herein. Moreover, not all illustrated features may be required to implement a method or methods in accordance with one or more embodiments of the invention.

FIG. 4 is a flow chart for a method 400 according to one or more embodiments of the invention.

Method 400 can detect or capture projectile data, for instance, projectile trajectory data as set forth herein 402. The data can be detected or captured electronically, for instance, via an infrared detection device, such as an IR camera, also called a focal plane array (FPA). The detected or captured data can be processed, for instance, to determine a travel path or trajectory of the projectile 404. Based on travel path or trajectory data, for example, a determined miss distance of the projectile, it is determined that the projectile is hostile (e.g., the corresponding vehicle was the intended target) of the projectile 406. Continuous detection and capture of projectile data can be performed. If it is determined that the projectile is hostile, a hostile fire indication may be provided, such as an electronic warning, for instance an audible, visual, and/or tactile warning or indication 408. The indication may indicate that the projectile is hostile (or even friendly), depending upon a determined miss distance from the vehicle, for example. Optionally, additional actions may be performed, such as moving the vehicle in response to the determination, deploying countermeasures, deploying weapon systems, and/or communicating projectile data and/or determinations based on the projectile data to one or more remote locations, such as another vehicle or vehicles 410. Any of the aforementioned additional actions may be performed automatically in response to a hostile fire determination.

FIG. 5 is a flow chart for a method 500 according to one or more embodiments of the invention.

Method 500 is similar to method 400 of FIG. 4, but expressly indicates that the captured and processed trajectory data is used to determine whether the projectile will hit or will likely hit the vehicle 506. Such hit determination can be used to provide a timely indication, such as an electronic warning, for instance an audible, visual, and/or tactile warning or indication, that the vehicle will be hit or will likely be hit 508. In response to the indication, additional actions can be undertaken by the vehicle, such as taking evasive maneuvers, deploying countermeasures and/or deploying weapon systems 510. Additionally, projectile data and hit data may be transmitted to a location remote from the vehicle. Such data may be used, for example, in the unfortunate event that the vehicle is disabled, in order to determine a location of the vehicle and/or a reason or likely reason why the vehicle became disabled.

FIG. 6 is a flow chart for method 600 according to one or more embodiments of the invention.

Method 600 is similar to method 500 of FIG. 5, but determines, based on the captured and processed projectile trajectory data, whether the projectile hit or likely hit the vehicle 606. Such hit or likely hit data can be representative of a calculation to obtain a probability number of hit or likely hit (or even a near miss). In response to the indication, additional actions can be undertaken. For example, the vehicle can alter its path. As another example, a determination can be made as to the location or area on the vehicle at which the projectile hit or likely hit the vehicle. Such hit or likely hit location data can be used to perform in-flight damage assessment by aircrew and/or post-flight inspection and maintenance, if necessary, to the vehicle upon returning from hostile areas.

It will be appreciated that portions (i.e., some, none, or all) of the circuits, circuitry, modules, processes, sections, systems, and system components described herein can be implemented in hardware, hardware programmed by software, software instructions stored on a non-transitory computer readable medium or a combination of the above.

For example, the processor can include, but is not limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a non-transitory computer-readable medium such as a computer memory or storage device which may be any suitable memory apparatus, such as, but not limited to ROM, PROM, EEPROM, RAM, flash memory, disk drive and the like.

Furthermore, the circuits, circuitry, modules, processes, systems, sections, and system components can be implemented as a single processor or as a distributed processor. Further, it should be appreciated that the steps mentioned above may be performed on a single or distributed processor (single and/or multi-core). Also, the processes, modules, and sub-modules described in the various figures of and for embodiments above may be distributed across multiple computers or systems or may be co-located in a single processor or system. Exemplary structural embodiment alternatives suitable for implementing the circuits, circuitry, modules, sections, systems, system components, means, or processes described herein are provided below.

The circuits, circuitry, modules, processors, systems, or system components described herein can be implemented as a programmed general purpose computer, an electronic device programmed with microcode, a hardwired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the user interface and/or computer programming arts.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

What is claimed is:

1. A system that is operative during the day and at night to determine whether a position is an intended target of a fired unguided energetic projectile, the system comprising:
an infrared (IR) camera mountable at the position, said IR camera having a field of view (FOV) and a predetermined sensitivity sufficient to capture a heat signature of the fired unguided energetic projectile, the heat signature including at least one of a firing component generated upon firing of the projectile and a friction component generated by friction as the projectile travels through the troposphere, pixels of said IR camera being operative to capture a portion of a trail of energy associated with the heat signature of the fired projectile; and
an image processor operative to receive signals from said IR camera corresponding to the captured portion of the trail of energy, said image processor being operative to process signals from said IR camera and to make a determination as to whether the position was the intended target of the fired projectile by analyzing a calculated miss distance vertical and horizontal miss distances of the fired projectile, the vertical and horizontal miss distances being calculated based on a product of vertical and horizontal pixel trails, respectively, in the captured portion of the trail of energy as functions of time and projectile velocity.

2. The system according to claim 1, further comprising:
an alert system operatively coupled to said image processor to generate timely audible and visible indications that the position is the intended target of the fired projectile based on the determination by said image processor that the position was the intended target of the fired projectile.

3. The system according to claim 1, wherein said IR camera is calibrated so as to set one or more miss distance thresholds indicative of hostile fire based on known velocities or velocity ranges of select known-to-be hostile projectiles and corresponding distance ranges of said projectiles.

4. The system according to claim 1, wherein the position is one of a helicopter, a ship, aircraft, a ground vehicle, a building, and a person.

5. The system according to claim 1, further comprising:
a countermeasure system mountable at the position that is operative to deploy one of a non-lethal weapon, a soft-kill, and a hard-kill weapon in response to the determination that the position was the intended target of the fired projectile, the weapon being deployed to a determined location or location area associated with the fired projectile,
wherein the determined location or location area is determined based on the signals from said IR camera corresponding to the captured portion of the trail of energy.

6. The system according to claim 5,
wherein the determined location or location area is determined based on the signals from said IR camera corresponding to the captured portion of the trail of energy and also based on signals from an other IR camera of the system, said other IR camera having a field of view (FOV) and a predetermined sensitivity sufficient to capture a heat signature of the fire unguided energetic projectile from the perspective of said other IR camera, the heat signature from the perspective of said other IR camera including at least one of a firing component generated upon firing of the projectile and a friction component generated by friction as the projectile travels through the troposphere, pixels of said other IR camera being operative to capture a portion of a trail of energy associated with the heat signature of the fired projectile from the perspective of said other IR camera, and
wherein the determined location or location area is an origination location or location area of the unguided energetic projectile and said image processor is configured and operative to process signals from said IR camera and signals from said other IR camera to determine a distance to the origination location or location area of the unguided energetic projectile.

7. The system according to claim 1, further comprising:
said IR camera and at least one more of said IR cameras, each of said IR cameras having a FOV, the FOVs combining to form a total FOV for the system.

8. The system according to claim 1, wherein the system is configured and operative to determine whether the projectile will hit, will likely hit, did hit, and/or did likely hit the position.

9. The system according to claim 1,
wherein the system is configured to represent the captured portion of the trail of energy as a two-dimensional representation over time, and
wherein the functions of time and projectile velocity include a rate of change of the projectile trace and the rate of rate of change of the projectile trace.

10. The system according to claim 1, wherein the miss distances are calculated based further on electronically stored data for one or more projectile types.

11. The system according to claim 10, wherein the electronically stored projectile type data includes, for each type of projectile, projectile velocity data and projectile distance data.

12. A method for indicating hostile fire, comprising:
electronically detecting infrared radiation of a projectile in a field of view (FOV);
electronically determining a travel path of the projectile based on said electronically detecting infrared radiation of the projectile in the FOV;
electronically calculating a miss distance of the projectile based on electronically stored data for one or more projectile types, the electronically stored projectile type data including, for each type of projectile, projectile velocity data and projectile distance data; and
based on said electronically calculating, electronically outputting an indication.

13. The method according to claim 12, wherein the output indication is an indication that the projectile is hostile.

14. The method according to claim 12, wherein the output indication is an indication of an origination point or area of the projectile.

15. The method according to claim 12, wherein the output indication is an indication of a portion of the projectile a determined travel path of the projectile.

16. The method according to claim 12,
wherein the electronically stored projectile velocity data includes constant or relatively constant velocity assumptions regarding projectile types and their corresponding calibers,
wherein the electronically stored projectile distance data includes lethal or threatening ranges of projectiles, and
wherein the electronically stored projectile data is stored in at least one of caliber-dependent bins and range-dependent bins.

17. The method according to claim 12, wherein electronically calculating a miss distance of the projectile includes calculating the miss distance and at least one other miss distance of the same projectile.

18. The method according to claim 12, wherein the miss distance is calculated based on a product of a first derivative of a detected projectile trace and a second derivative of the detected projectile trace.

19. The method according to claim 12, wherein, in addition to being based on said electronically calculating, said electronically outputting the indication that the projectile is hostile is based on a determination that the projectile is not in its damaging or lethal trajectory stage.

20. A method for processing a projectile heat signature, the method comprising nontransitory computer readable storage medium having stored thereon software instructions that, when executed by a processor, cause the processor to perform operations comprising:
analyzing received electronic data regarding a sensed heat signature of an unguided projectile; and
determining a miss distance of the unguided projectile based on the analyzed received electronic data, the miss distance being at least one of a vertical miss distance and a horizontal miss distance.

21. The method nontransitory computer readable storage medium according to claim 20, wherein the received electronic data is from an IR camera that captures the sensed heat signature of the unguided projectile, the miss distance being calculated based on a product of the rate of projectile velocity change and the rate of rate of change.

22. The method nontransitory computer readable storage medium according to claim 21, wherein the stored software instructions, when executed by the processor, cause the processor to perform operations further comprising:
responsive to the determined miss distance of the unguided projectile, identifying identify whether or not the unguided projectile is hostile or friendly; and
in the case of a hostile identification, outputting output an indication that the unguided projectile is hostile.

23. The method according to claim 20,
wherein the heat signature is sensed by electronically detecting infrared radiation of the projectile in a field of view (FOV); and
wherein the determining the miss distance is further based on electronically stored data for one or more projectile types.

24. The method according to claim 23, wherein the electronically stored projectile type data includes, for each type of projectile, projectile velocity data and projectile distance data.

* * * * *